US010527859B2

(12) United States Patent
Tanaka et al.

(10) Patent No.: US 10,527,859 B2
(45) Date of Patent: Jan. 7, 2020

(54) IMAGE DISPLAY DEVICE AND DISPLAY APPARATUS

(71) Applicant: Sony Corporation, Tokyo (JP)

(72) Inventors: Eiichi Tanaka, Chiba (JP); Hirokazu Tatsuta, Kanagawa (JP); Shin Hasegawa, Kanagawa (JP); Yuichi Hasegawa, Tokyo (JP); Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/781,972

(22) PCT Filed: Mar. 12, 2014

(86) PCT No.: PCT/JP2014/056544
§ 371 (c)(1),
(2) Date: Oct. 2, 2015

(87) PCT Pub. No.: WO2014/167934
PCT Pub. Date: Oct. 16, 2014

(65) Prior Publication Data
US 2016/0041394 A1 Feb. 11, 2016

(30) Foreign Application Priority Data
Apr. 11, 2013 (JP) ................................. 2013-082829

(51) Int. Cl.
*G02B 27/01* (2006.01)
*G09G 3/36* (2006.01)
*G02B 7/12* (2006.01)

(52) U.S. Cl.
CPC ..... *G02B 27/0176* (2013.01); *G02B 27/0172* (2013.01); *G02B 27/0179* (2013.01);
(Continued)

(58) Field of Classification Search
CPC .......................... G02B 27/0176; G02B 27/02; G02B 27/0983; G02B 9/16; G02B 2027/0154;
(Continued)

(56) References Cited

U.S. PATENT DOCUMENTS

| 5,473,365 A | 12/1995 | Okamura |
| 5,479,224 A | 12/1995 | Yasugaki et al. |

(Continued)

FOREIGN PATENT DOCUMENTS

| CN | 1391126 A | 1/2003 |
| CN | 1813213 A | 8/2006 |

(Continued)

OTHER PUBLICATIONS

STIC search (Year: 2019).*

(Continued)

*Primary Examiner* — Stephone B Allen
*Assistant Examiner* — Travis S Fissel
(74) *Attorney, Agent, or Firm* — Wolf, Greenfield & Sacks, P.C.

(57) ABSTRACT

There is provided a display apparatus including: a frame 20 that is mounted on a head part of a viewer; and an image display device 30 that is mounted on the frame 20. The image display device 30 includes (A) an image forming device 40, and (B) an optical system 50 that guides an image, which originates from the image forming device 40, into a pupil of a viewer. The image forming device 40 is curved along an X direction and/or a Y direction. The image display device 30 further includes an image-forming-device-to-optical-system distance adjustment unit 90 that adjusts a distance between the image forming device 40 and the optical system 50.

18 Claims, 13 Drawing Sheets

(52) U.S. Cl.
CPC .............. *G09G 3/36* (2013.01); *G02B 7/12* (2013.01); *G02B 2027/015* (2013.01); *G02B 2027/0127* (2013.01); *G02B 2027/0132* (2013.01); *G02B 2027/0152* (2013.01); *G02B 2027/0159* (2013.01); *G02B 2027/0161* (2013.01)

(58) Field of Classification Search
CPC ...... G02B 2027/0161; G02B 2027/169; G02B 2027/185
USPC ....... 359/631, 632, 644, 645, 663, 664, 671, 359/785, 716
See application file for complete search history.

(56) References Cited

U.S. PATENT DOCUMENTS

| | | | |
|---|---|---|---|
| 5,486,841 A * | 1/1996 | Hara | G02B 7/12 345/8 |
| 5,739,797 A | 4/1998 | Karasawa et al. | |
| 5,748,375 A | 5/1998 | Yamana | |
| 5,774,096 A | 6/1998 | Usuki et al. | |
| 5,793,339 A * | 8/1998 | Takahashi | G02B 17/08 345/7 |
| 5,828,432 A | 10/1998 | Shashidhar et al. | |
| 5,835,279 A * | 11/1998 | Marshall | G02B 13/18 359/645 |
| 6,100,862 A * | 8/2000 | Sullivan | G06T 15/00 345/424 |
| 6,124,837 A | 9/2000 | Usuki et al. | |
| 6,172,657 B1 | 1/2001 | Kamakura et al. | |
| 6,239,771 B1 | 5/2001 | Usuki et al. | |
| 6,529,331 B2 * | 3/2003 | Massof | G02B 27/017 345/9 |
| 7,446,941 B2 | 11/2008 | Fukuda | |
| 8,411,134 B2 | 4/2013 | Tomita | |
| 8,570,242 B2 | 10/2013 | Chosokabe et al. | |
| 8,739,797 B2 * | 6/2014 | Bonutti | A41D 19/0157 128/846 |
| 8,797,433 B2 | 8/2014 | Kaizu et al. | |
| 8,861,090 B2 | 10/2014 | Mukawa | |
| 8,907,865 B2 | 12/2014 | Miyawaki et al. | |
| 8,976,453 B2 | 3/2015 | Akutsu et al. | |
| 8,988,315 B2 | 3/2015 | Mukawa et al. | |
| 9,016,864 B2 | 4/2015 | Sasazaki et al. | |
| 9,164,221 B2 | 10/2015 | Akutsu et al. | |
| 9,201,242 B2 | 12/2015 | Miyawaki et al. | |
| 9,311,752 B2 | 4/2016 | Chosokabe et al. | |
| 9,451,244 B2 | 9/2016 | Sasazaki et al. | |
| 9,488,846 B2 | 11/2016 | Hayashi | |
| 9,558,540 B2 | 1/2017 | Mukawa | |
| 9,569,897 B2 | 2/2017 | Miyawaki et al. | |
| 9,658,456 B2 | 5/2017 | Mukawa | |
| 9,709,809 B2 | 7/2017 | Miyawaki et al. | |
| 9,726,890 B2 | 8/2017 | Akutsu et al. | |
| 9,753,284 B2 | 9/2017 | Machida et al. | |
| 9,759,920 B2 | 9/2017 | Akutsu et al. | |
| 9,766,453 B2 | 9/2017 | Mukawa | |
| 9,791,701 B2 | 10/2017 | Ato et al. | |
| 9,899,000 B2 | 2/2018 | Takahota et al. | |
| 9,933,621 B2 | 4/2018 | Hirano et al. | |
| 9,952,435 B2 | 4/2018 | Tanaka et al. | |
| 9,972,135 B2 | 5/2018 | Mukawa | |
| 10,018,846 B2 | 7/2018 | Machida et al. | |
| 10,302,946 B2 | 5/2019 | Aiki | |
| 10,338,388 B2 | 7/2019 | Hirano et al. | |
| 2002/0047952 A1 | 4/2002 | Kawata | |
| 2002/0181115 A1 | 12/2002 | Massof et al. | |
| 2002/0196554 A1 | 12/2002 | Cobb et al. | |
| 2004/0212776 A1 | 10/2004 | Spitzer et al. | |
| 2004/0227703 A1 * | 11/2004 | Lamvik | G02B 27/0172 345/76 |
| 2005/0046954 A1 | 3/2005 | Achtner | |
| 2006/0056069 A1 * | 3/2006 | Kao | G02B 9/14 359/785 |
| 2006/0098153 A1 | 5/2006 | Silkkerveer et al. | |
| 2006/0119539 A1 | 6/2006 | Kato et al. | |
| 2008/0198097 A1 | 8/2008 | Ishino et al. | |
| 2008/0239499 A1 | 10/2008 | Fukuda | |
| 2009/0115968 A1 | 5/2009 | Sugiyama | |
| 2009/0237917 A1 | 9/2009 | Kutnyak | |
| 2009/0243970 A1 | 10/2009 | Kato et al. | |
| 2010/0073593 A1 | 3/2010 | Sasaki et al. | |
| 2010/0091031 A1 | 4/2010 | Tsujimoto | |
| 2010/0128107 A1 | 5/2010 | Tomita | |
| 2010/0195040 A1 | 8/2010 | Koganezawa | |
| 2010/0214635 A1 * | 8/2010 | Sasaki | G02B 27/0101 359/15 |
| 2010/0226017 A1 | 9/2010 | Spaller | |
| 2010/0271710 A1 | 10/2010 | Ohashi | |
| 2011/0241975 A1 | 10/2011 | Mukawa et al. | |
| 2011/0248904 A1 | 10/2011 | Miyawaki et al. | |
| 2011/0248905 A1 | 10/2011 | Chosokabe et al. | |
| 2012/0044571 A1 | 2/2012 | Mukawa | |
| 2012/0056885 A1 | 3/2012 | Ishii et al. | |
| 2012/0127434 A1 | 5/2012 | Sasazaki et al. | |
| 2012/0154920 A1 * | 6/2012 | Harrison | G02B 3/0056 359/619 |
| 2012/0200934 A1 | 8/2012 | Fujishiro | |
| 2012/0212484 A1 | 8/2012 | Haddick et al. | |
| 2012/0218426 A1 | 8/2012 | Kaizu et al. | |
| 2012/0249891 A1 | 10/2012 | Sato et al. | |
| 2013/0003028 A1 * | 1/2013 | Lin | G02B 26/101 353/98 |
| 2013/0128611 A1 | 5/2013 | Akutsu et al. | |
| 2013/0135749 A1 | 5/2013 | Akutsu et al. | |
| 2013/0242555 A1 | 9/2013 | Mukawa | |
| 2013/0278497 A1 | 10/2013 | Takagi et al. | |
| 2013/0300766 A1 | 11/2013 | Mukawa | |
| 2014/0009914 A1 | 1/2014 | Cho et al. | |
| 2014/0022284 A1 | 1/2014 | Chosokabe et al. | |
| 2014/0043320 A1 * | 2/2014 | Tosaya | G02B 27/0172 345/419 |
| 2014/0104692 A1 | 4/2014 | Bickerstaff et al. | |
| 2014/0152531 A1 | 6/2014 | Murray et al. | |
| 2014/0266990 A1 | 9/2014 | Makino et al. | |
| 2014/0334010 A1 | 11/2014 | Mukawa | |
| 2014/0340286 A1 | 11/2014 | Machida et al. | |
| 2014/0340550 A1 | 11/2014 | Kaizu et al. | |
| 2014/0340609 A1 | 11/2014 | Taylor et al. | |
| 2014/0347252 A1 | 11/2014 | Miyawaki et al. | |
| 2015/0062699 A1 | 3/2015 | Hayashi | |
| 2015/0077312 A1 | 3/2015 | Wang | |
| 2015/0109679 A1 | 4/2015 | Mukawa et al. | |
| 2015/0138647 A1 | 5/2015 | Akutsu et al. | |
| 2015/0226970 A1 | 8/2015 | Mukawa | |
| 2015/0229897 A1 | 8/2015 | Mukawa | |
| 2015/0235620 A1 | 8/2015 | Takahota et al. | |
| 2015/0260994 A1 | 9/2015 | Akutsu et al. | |
| 2015/0260995 A1 | 9/2015 | Mukawa | |
| 2015/0269784 A1 | 9/2015 | Miyawaki et al. | |
| 2015/0277125 A1 | 10/2015 | Hirano et al. | |
| 2015/0277126 A1 | 10/2015 | Hirano et al. | |
| 2015/0288954 A1 | 10/2015 | Sasazaki et al. | |
| 2015/0338660 A1 | 11/2015 | Mukawa | |
| 2015/0346494 A1 | 12/2015 | Tanaka et al. | |
| 2015/0362735 A1 | 12/2015 | Akutsu et al. | |
| 2015/0370075 A1 | 12/2015 | Ato et al. | |
| 2016/0062123 A1 | 3/2016 | Tanaka et al. | |
| 2016/0097931 A1 | 4/2016 | Takahota et al. | |
| 2016/0147069 A1 | 5/2016 | Tanaka et al. | |
| 2016/0154243 A1 | 6/2016 | Aiki | |
| 2017/0052379 A1 * | 2/2017 | Yang | G02B 5/3083 |
| 2017/0069140 A1 | 3/2017 | Mukawa | |
| 2017/0115112 A1 * | 4/2017 | Srocka | G01B 11/06 |
| 2017/0115492 A1 | 4/2017 | Miyawaki et al. | |
| 2017/0184857 A1 | 6/2017 | Ato et al. | |
| 2017/0322420 A1 | 11/2017 | Machida et al. | |

(56) References Cited

U.S. PATENT DOCUMENTS

| | | | |
|---|---|---|---|
| 2018/0136472 A1 | 5/2018 | Tanaka et al. | |
| 2018/0211449 A1 | 7/2018 | Mukawa | |

FOREIGN PATENT DOCUMENTS

| | | | | |
|---|---|---|---|---|
| CN | 102375235 | A | 3/2012 | |
| CN | 102910127 | A | 2/2013 | |
| EP | 0 679 919 | A2 | 11/1995 | |
| EP | 0 716 329 | A1 | 6/1996 | |
| EP | 0 908 754 | A2 | 4/1999 | |
| EP | 1 191 411 | A2 | 3/2002 | |
| EP | 1 267 197 | A2 | 12/2002 | |
| EP | 1860612 | A2 | 11/2007 | |
| EP | 2 421 276 | A2 | 2/2012 | |
| GB | 2 413 717 | A | 11/2005 | |
| JP | 62-105184 | A | 5/1987 | |
| JP | 05-134208 | A | 5/1993 | |
| JP | 06-003641 | A | 1/1994 | |
| JP | H07-72420 | A | 3/1995 | |
| JP | 07-115607 | A | 5/1995 | |
| JP | 07-318850 | A | 12/1995 | |
| JP | 08-082762 | A | 3/1996 | |
| JP | 08-166557 | A | 6/1996 | |
| JP | 08-191462 | A | 7/1996 | |
| JP | 09-049999 | A | 2/1997 | |
| JP | 09-133876 | A | 5/1997 | |
| JP | 10-104548 | A | 4/1998 | |
| JP | 10-206786 | A | 8/1998 | |
| JP | 2000-352690 | A | 12/2000 | |
| JP | 2002-049021 | A | 2/2002 | |
| JP | 2002-341792 | A | 11/2002 | |
| JP | 2004-139132 | A | 5/2004 | |
| JP | 2004-233867 | A | 8/2004 | |
| JP | 2005-099788 | A | 4/2005 | |
| JP | 2006-317604 | A | 11/2006 | |
| JP | 2007-086500 | A | 4/2007 | |
| JP | 2008-224850 | A | 9/2008 | |
| JP | 2010-039441 | A | 2/2010 | |
| JP | 2012-042654 | A | 3/2012 | |
| JP | 2012-063633 | A | 3/2012 | |
| JP | 2013-045020 | A | 3/2013 | |
| WO | WO 2013/076994 | A | 5/2013 | |
| WO | WO-2013076994 | A1 * | 5/2013 | ........... G02B 27/017 |

OTHER PUBLICATIONS

Chinese Office Action dated Mar. 22, 2018 in connection with Chinese Application No. 201480002757.2 and English translation thereof.
Chinese Office Action dated May 22, 2018 in connection with Chinese Application No. 201480002217.4 and English translation thereof.
Partial European Search Report dated Dec. 21, 2018 in connection with European Application No. 18191653.7.
European communication Pursuant to Article 94(3) EPC dated Jul. 16, 2018 in connection with European Application No. 14825860.1.
Japanese Office Action dated Nov. 27, 2018 in connection with Japanese Application No. 2015-511197 and English translation thereof.
Extended European Search Report dated Mar. 29, 2019 in connection with European Application No. 18191653.7.

* cited by examiner

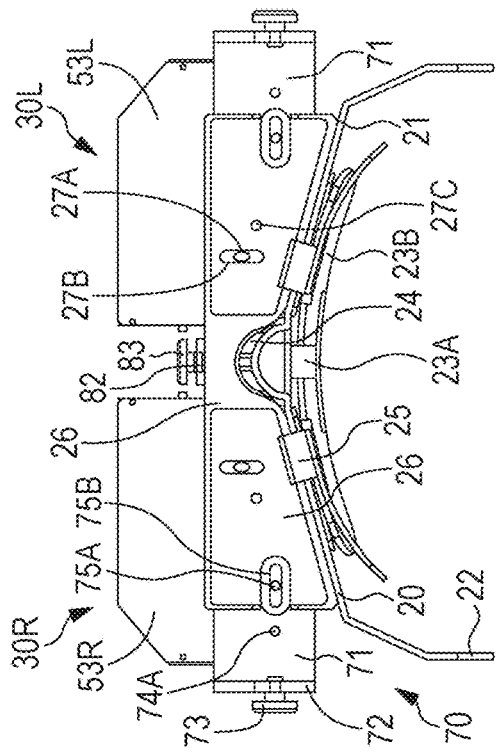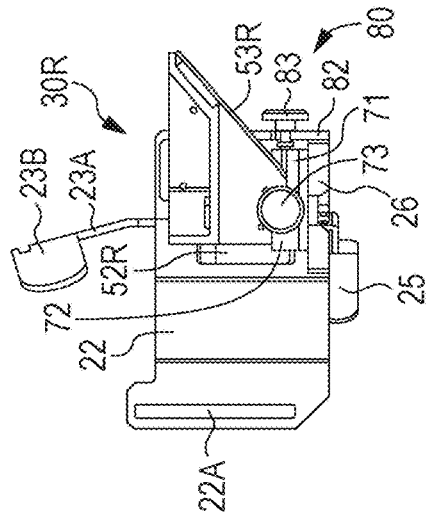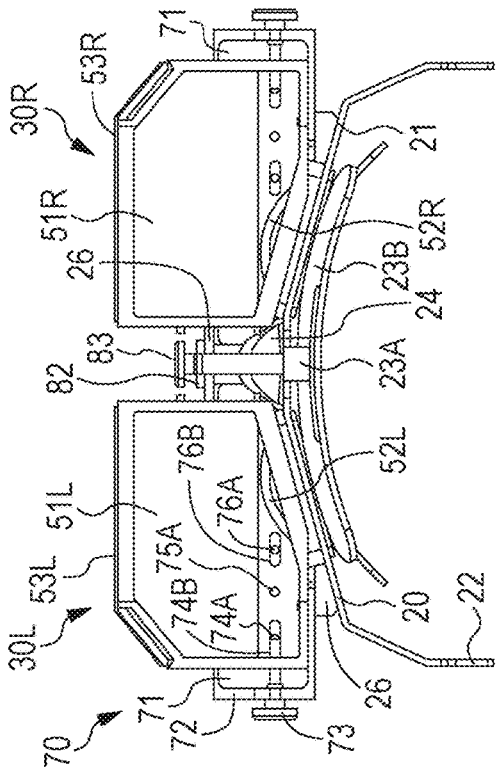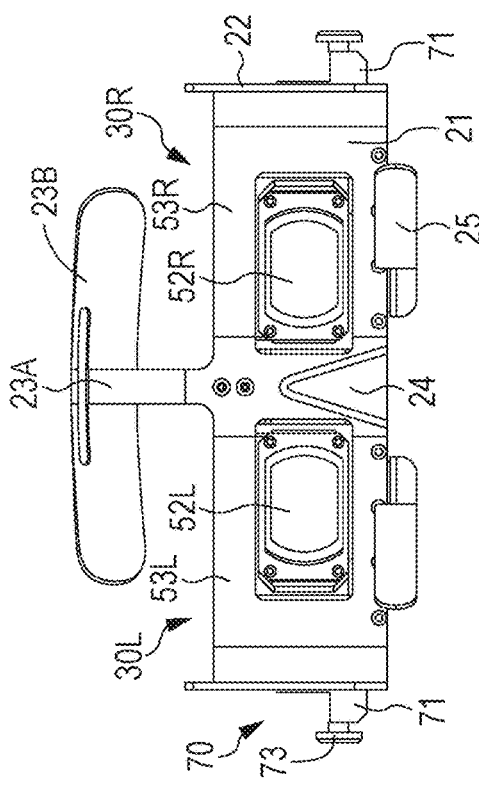

IMAGE DISPLAY DEVICE AND DISPLAY APPARATUS

CROSS REFERENCE TO RELATED APPLICATIONS

This application claims the benefit under 35 U.S.C. § 371 as a U.S. National Stage Entry of International Application No. PCT/JP2014/056544, filed in the Japanese Patent Office as a Receiving Office on Mar. 12, 2014, which claims priority to Japanese Patent Application Number 2013-082829, filed in the Japanese Patent Office on Apr. 11, 2013, each of which is hereby incorporated by reference in its entirety.

TECHNICAL FIELD

The present disclosure relates to an image display device, and a display apparatus having the corresponding image display device. More specifically, the present disclosure relates to a display apparatus used as, for example, a head mounted display (HMD).

BACKGROUND ART

For example, as well known in Japanese Unexamined Patent Application Publication No. 5-134208, there are virtual image display apparatuses (display apparatuses) for causing a viewer to view a 2-dimensional image, which is formed by an image forming device, as an enlarged virtual image through a virtual image optical system.

In the technology disclosed in Japanese Unexamined Patent Application Publication No. 5-134208, the virtual image display apparatus illuminates a liquid crystal display section with light which originates from a light source and is collimated by a lens through a polarization plate, and the image light of the illuminated liquid crystal display section is concentrated at a first focal point by a lens group, and the concentrated light is reflected by a concave mirror, is concentrated at a second focal point in front of a crystalline lens of a pupil through a polarization plate, and reaches a retina. Thereby, a user is able to view a video.

CITATION LIST

Patent Literature

PTL 1: Japanese Unexamined Patent Application Publication No. 5-134208

SUMMARY OF INVENTION

Technical Problem

Meanwhile, in the technology disclosed in Japanese Unexamined Patent Application Publication No. 5-134208, the virtual image display apparatus includes a plurality of optical systems (lens, lens group and concave mirror). The virtual image display apparatus is not satisfactory for reduction in size and weight. Further, it is difficult for a viewer who wears eyeglasses to use an HMD in a state where the viewer wears the eyeglasses. Accordingly, it is preferable that the HMD be used in a state where the eyeglasses are taken off. However, according to investigation of inventors of the present disclosure, a display apparatus having a simple configuration or structure, which is appropriately and easily adaptable to viewer's eyesight, has not been known.

Further, a distance between the pupil and the lens group is different in accordance with a viewer. However, according to investigation of inventors of the present disclosure, a simple configuration or structure, which is capable of appropriately and easily adjusting the difference in the distance, has also not been known.

Accordingly, according to a first object of the present disclosure, it is desirable to provide an image display device having a simple configuration or structure, which is appropriately and easily adaptable to viewer's eyesight while having a small size, a light weight, and a large viewing angle, and a display apparatus having the corresponding image display device. Further, according to a second object of the present disclosure, it is desirable to provide an image display device having a simple configuration or structure, which is capable of appropriately and easily adjusting the difference in the distance between the pupil of the viewer and the lens group while having a small size, a light weight, and a large viewing angle, and a display apparatus having the corresponding image display device.

Solution to Problem

In order to achieve the first object, according to first and second embodiments of the present disclosure, there is provided a display apparatus including: (a) a frame; and (b) an image display device that is mounted on the frame. The image display device includes (A) an image forming device, and (B) an optical system that guides an image, which originates from the image forming device, into a pupil of a viewer. Assuming that a direction of the image forming device corresponding to a first direction of the image is an X direction and a direction of the image forming device corresponding to a second direction of the image different from the first direction is a Y direction, the image forming device is curved along the X direction, the Y direction, or the X and Y directions. Further, in order to achieve the first object, according to the first and second embodiments of the present disclosure, there is provided an image display device including: (A) an image forming device; and (B) an optical system that guides an image, which originates from the image forming device, into a pupil of a viewer. Assuming that a direction of the image forming device corresponding to a first direction of the image is an X direction and a direction of the image forming device corresponding to a second direction of the image different from the first direction is a Y direction, the image forming device is curved along the X direction, the Y direction, or the X and Y directions.

Here, the first direction or the X direction corresponds to a horizontal direction of the image which ultimately reaches the pupil of the viewer, and the second direction or the Y direction corresponds to a vertical direction of the image which ultimately reaches the pupil of the viewer. The X and Y directions may be orthogonal or may be non-orthogonal.

In addition, the image display device of the display apparatus according to the first embodiment of the present disclosure, or the image display device according to the first embodiment of the present disclosure further includes an image-forming-device-to-optical-system distance adjustment unit that adjusts a distance between the image forming device and the optical system. Further, the image display device of the display apparatus according to the second embodiment of the present disclosure, or the image display device according to the second embodiment of the present disclosure further includes a pupil-to-optical-system distance adjustment unit that adjusts a distance between the optical system and the pupil of the viewer.

Advantageous Effects of Invention

In the display apparatus of the present disclosure or the image display device of the present disclosure, the image forming device has a curved shape. Therefore, for example, it is possible to decrease an optical path length difference between an optical path length of light emitted from the center portion of the image forming device and an optical path length of light emitted from an edge portion of a display region of the image forming device. As a result, it is possible to achieve a large viewing angle while achieving a small size and a light weight. In addition, in the display apparatus or the image display device according to the first embodiment of the present disclosure, the image display device further includes an image-forming-device-to-optical-system distance adjustment unit that adjusts a distance between the image forming device and the optical system. Therefore, despite a simple configuration or structure, it is possible to provide a display apparatus which is appropriately and easily adaptable to the difference in eyesight of a viewer. Further, in the display apparatus or the image display device according to the second embodiment of the present disclosure, the image display device further includes a pupil-to-optical-system distance adjustment unit that adjusts a distance between the optical system and the pupil of the viewer. Therefore, despite a simple configuration or structure, it is possible to provide a display apparatus which is capable of appropriately and easily adjusting or controlling the difference in the distance between the pupil of the viewer and the lens group.

BRIEF DESCRIPTION OF DRAWINGS

FIGS. 10A, 10B, 10C, and 10D are respectively a bottom plan view, a plan view, a right side view, and a back view of the display apparatus of Example 1.

DESCRIPTION OF EMBODIMENTS

Figure 1:
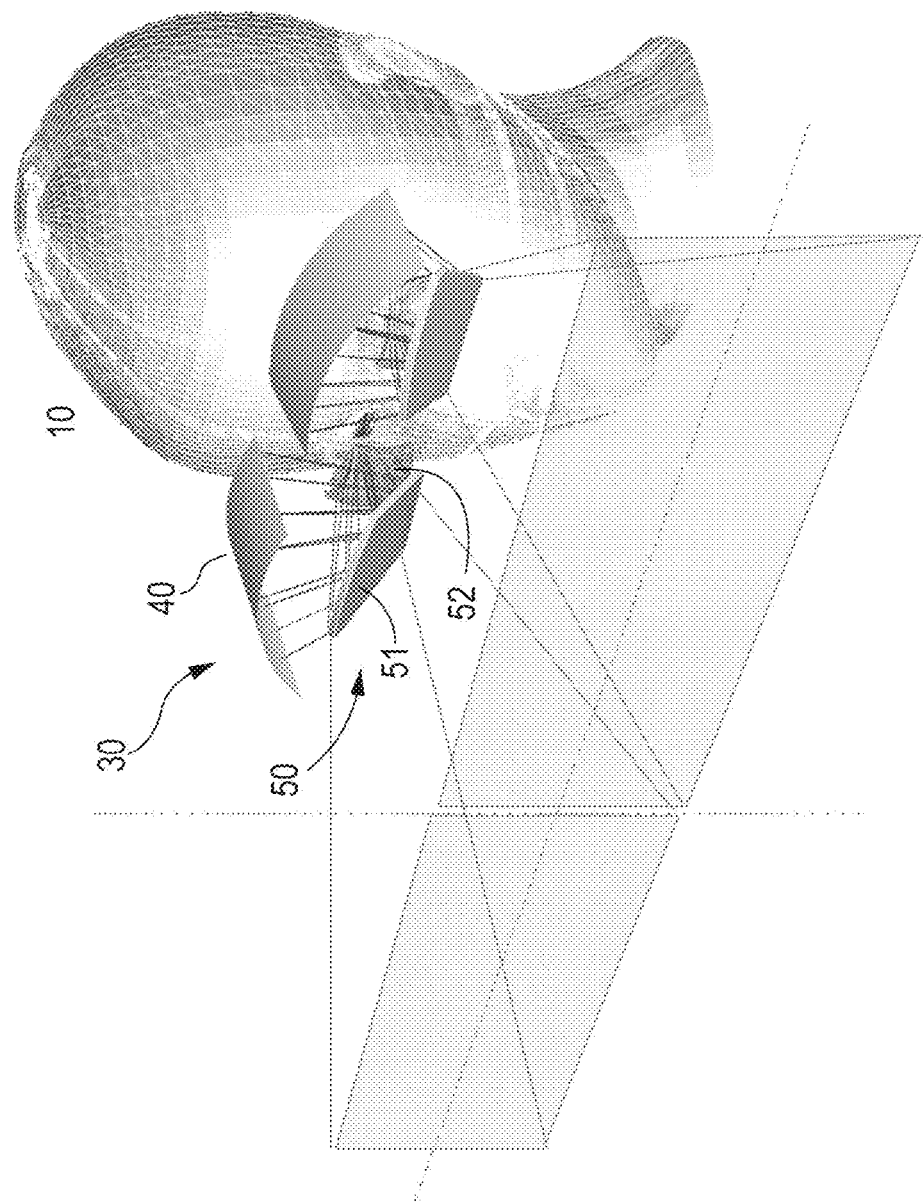
FIG. 1 is a perspective view of main sections of a display apparatus when a viewer wears the display apparatus.

Hereinafter, referring to drawings, the present disclosure will be described on the basis of examples, but the present disclosure is not limited to examples, and various numerical values and materials in examples are examples. Description will be given in the following order:
1. Overview of Image Display Device and Display Apparatus According to First and Second Embodiments of Present Disclosure
2. Example 1 (Image Display Device and Display Apparatus According to First and Second Embodiments of Present Disclosure
3. Example 2 (Modification of Example 1)
4. Example 3 (Another Modification of Example 1); and Others

[Overview of Image Display Device and Display Apparatus According to First and Second Embodiments of Present Disclosure]

A display apparatus or an image display device according to the first embodiment of the present disclosure may further include a display control device that controls a size of the entire image obtained from an image forming device in accordance with a distance between the image forming device and an optical system. For the distance between the image forming device and the optical system, a distance detection device, which detects the distance between the image forming device and the optical system, may be disposed in an image-forming-device-to-optical-system distance adjustment unit. The distance detection device may be an appropriate device which depends on a configuration or structure of the image-forming-device-to-optical-system distance adjustment unit. The control of the size of the entire image may be performed in a well-known control method of increasing or decreasing the size of the entire image by performing various kinds of signal processing (for example, thinning-out processing and interpolation processing) on an image signal which is used in order for the image forming device to form an image.

In the display apparatus or the image display device according to the first embodiment of the present disclosure including the preferred embodiment, the optical system may be formed of a reflector, which reflects the image obtained from the image forming device, and a lens group into which the image reflected by the reflector is incident, and the image display device may further include a pupil-to-optical-system distance adjustment unit that adjusts a distance between the optical system and the pupil of the viewer. In addition, in this case, the lens group may be disposed between the pupil of the viewer and the reflector, and the image forming device may be disposed above the reflector.

Further, in a display apparatus or an image display device according to a second embodiment of the present disclosure, the optical system may be formed of the reflector, which reflects the image obtained from the image forming device, and the lens group into which the image reflected by the reflector is incident, and the pupil-to-optical-system distance adjustment unit may adjust a distance between the lens group and the pupil of the viewer.

In addition, in the display apparatus or the image display device according to the second embodiment of the present disclosure including the preferred embodiment, the lens group may be disposed between the pupil of the viewer and the reflector, and the image forming device may be disposed above the reflector.

In the display apparatus or the image display device according to the first or second embodiment of the present disclosure including the above-mentioned preferred embodiment, assuming that an axis passing through a predetermined point (for example, a contact point between the image forming device and an optical axis to be described later) of the image forming device in parallel with the X direction is an X axis and an axis passing through a predetermined point (for example, the contact point between the image forming device and the optical axis) of the image forming device in parallel with the Y direction is a Y axis, the image display device may further include a rotation device that rotates the image forming device about at least one axis of the X axis, the Y axis, and a Z axis. Specifically, examples of the rotation device may include: a rotation device that rotates the image forming device about the X axis; a rotation device that rotates the image forming device about the Y axis; a rotation device that rotates the image forming device about the Z axis; a rotation device that rotates the image forming device about the X and Y axes; a rotation device that rotates the image forming device about the X and Z axes; a rotation device that rotates the image forming device about the Y and Z axes; and a rotation device that rotates the image forming device about the X, Y, and Z axes. Further, the display apparatus or the image display device according to the first or second embodiment of the present disclosure including the above-mentioned preferred embodiment may further include a movement device that moves the image forming device relative to the reflector along the X direction.

In the display apparatus or the image display device according to the first or second embodiment of the present disclosure including the above-mentioned preferred embodiment, the image display device may further include a supporting member which supports the image forming device, and a supporting surface of the supporting member, which supports the image forming device, may be curved. In addition, in such a configuration, a degree of a curvature of the supporting surface of the supporting member along the X direction may be greater than a degree of a curvature thereof along the Y direction. That is, when the degree of the curvature is represented by an average radius of curvature, an average radius of curvature of the supporting surface of the supporting member along the X direction may be less than an average radius of curvature thereof along the Y direction.

Further, in various preferred configurations mentioned above, the supporting member may include a pressing member, an outer shape of the image forming device may be a rectangular shape, and an outer peripheral portion of the image forming device, which extends along the X direction, may be fixed onto the supporting member by the pressing member. In addition, an outer peripheral portion of the image forming device indicates a region (so-called frame region) between an end portion of the image forming device and an end portion of a display region of the image forming device. Also in the following description, it is the same. Alternatively, an outer shape of the image forming device may be a rectangular shape, and an outer peripheral portion of the image forming device, which extends along the X direction, may be pinched by the supporting member. However, the present disclosure is not limited to such a configuration. In some cases, by using an adhesive, the image forming device may be fixed on the supporting member. The supporting member may be formed of, for example, various plastic materials including an ABS resin and the like, compound materials such as unilate (registered trademark, made by Unitika, Ltd.) and FRP, carbon fibers, metallic materials such as aluminum, and alloy materials.

Furthermore, in the display apparatus or the image display device according to the first or second embodiment of the present disclosure of the above-mentioned preferred configurations, an outer shape of the image forming device may be a rectangular shape, and wiring may extend outward from an outer peripheral portion of the image forming device extending along the Y direction. Here, examples of the wiring may include a flexible print wiring board (FPC). It is preferable that the wiring and a connection portion provided on the outer peripheral portion of the image forming device be connected on the basis of a well-known method.

Further, in the display apparatus or the image display device according to the first or second embodiment of the present disclosure including the above-mentioned preferred embodiments and configurations, the lens group may be formed of a group of three lenses, a second lens thereof may have a negative power, and a refractive index of a material of the second lens may be greater than refractive indexes of materials of first and third lenses. Furthermore, the first and third lenses may have positive powers. It is preferable that the second lens be a meniscus lens. It is preferable that the lens group be a telecentric optical system, specifically, an optical system which is telecentric on the reflector side. Thereby, even when the image-forming-device-to-optical-system distance adjustment unit adjusts the distance between the image forming device and the optical system, it is possible to reliably suppress change in the image reaching the pupil of the viewer.

Furthermore, the display apparatus according to the first or second embodiment of the present disclosure including the above-mentioned preferred embodiments and configurations may further include a left-eye image display device and a right-eye image display device. Overlap (binocular viewing angle) of a horizontal view of the left-eye image display device and a horizontal view of the right-eye image display device may be in a range of, for example, 45 to 75 degrees. In addition, it is preferable that the display apparatus having such a configuration further include an image display device distance adjustment unit that adjusts a distance between the left-eye image display device and the right-eye image display device. By providing the image display device distance adjustment unit, it is easy for the apparatus to be adaptable to viewers having different interpupil distances. In some cases, the image display device may include: a single image forming device; an optical system that guides an image, which originates from the single image forming device, into each of a right pupil and a left pupil of a viewer; and a supporting member that supports the image forming device. In this case, the optical system may include, for example, at least a reflector and a lens group for a left eye, and a reflector and a lens group for a right eye.

Moreover, in the display apparatus or the image display device according to the first or second embodiment of the present disclosure including the above-mentioned preferred embodiments and configurations, the image forming device may be any type of an image forming device if the image forming device is flexible. However, it is preferable that the image forming device include an organic electroluminescent display device (organic EL display device). The organic EL display device itself may be an organic EL display device having a well-known configuration or structure.

Furthermore, in the display apparatus according to the first or second embodiment of the present disclosure including the above-mentioned preferred embodiments and configurations, the frame may be mounted on a head part of a viewer. However, the present disclosure is not limited to such a configuration. For example, the frame may be provided on an arm extending from a ceiling or a wall, and may be provided on a robot arm which is movable. Moreover, by detecting motion of a head part of a viewer with a sensor, motion of the frame may be made to follow the motion of the head part of the viewer.

In the case of adopting a configuration where the frame is mounted on a head part of a viewer, any type of the frame can be used if the frame has a configuration or structure where the frame can be mounted on a head part of a viewer and an image display device can be provided on the frame. For example, the frame may be formed of a front part, which is disposed in front of a viewer, and side parts which extend from both ends of the front part. Here, the image display device is provided on the frame. Specifically, for example, the image display device is mounted on the lower side of the front part, and is mounted on a holding member which extends in the substantially horizontal direction. Further, in terms of improvement in a viewer's feeling at the time of mounting the image display device, it is preferable that a forehead contact part, which comes into contact with a forehead of a viewer, be mounted on the upper side of the front part.

Furthermore, in the display apparatus or the image display device according to the first or second embodiment of the present disclosure including the above-mentioned preferred embodiments and configurations, a length $L_X$ of the display region of the image forming device along the X direction may be in a range of, for example, 83 mm to 130 mm. The number of pixels of the image forming device may be, for example, 320×240, 432×240, 640×480, 1024×768, 1920×1080, or the like. A horizontal viewing angle (monocular viewing angle) of the image display device may be in a range of, for example, 100 to 120 degrees.

Figure 14:
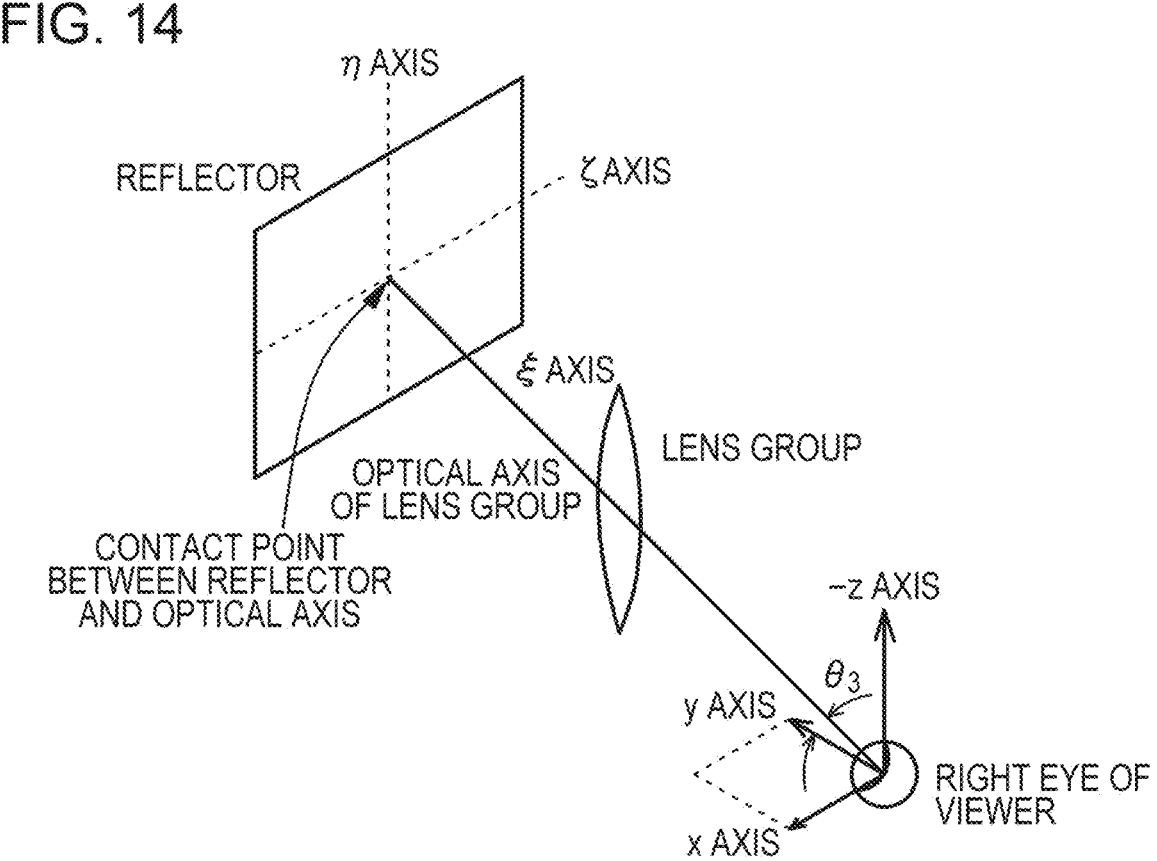
FIG. 14 is a conceptual diagram of a reflector and the like illustrating a state where the reflector constituting the optical system is disposed.
Figure 15A:
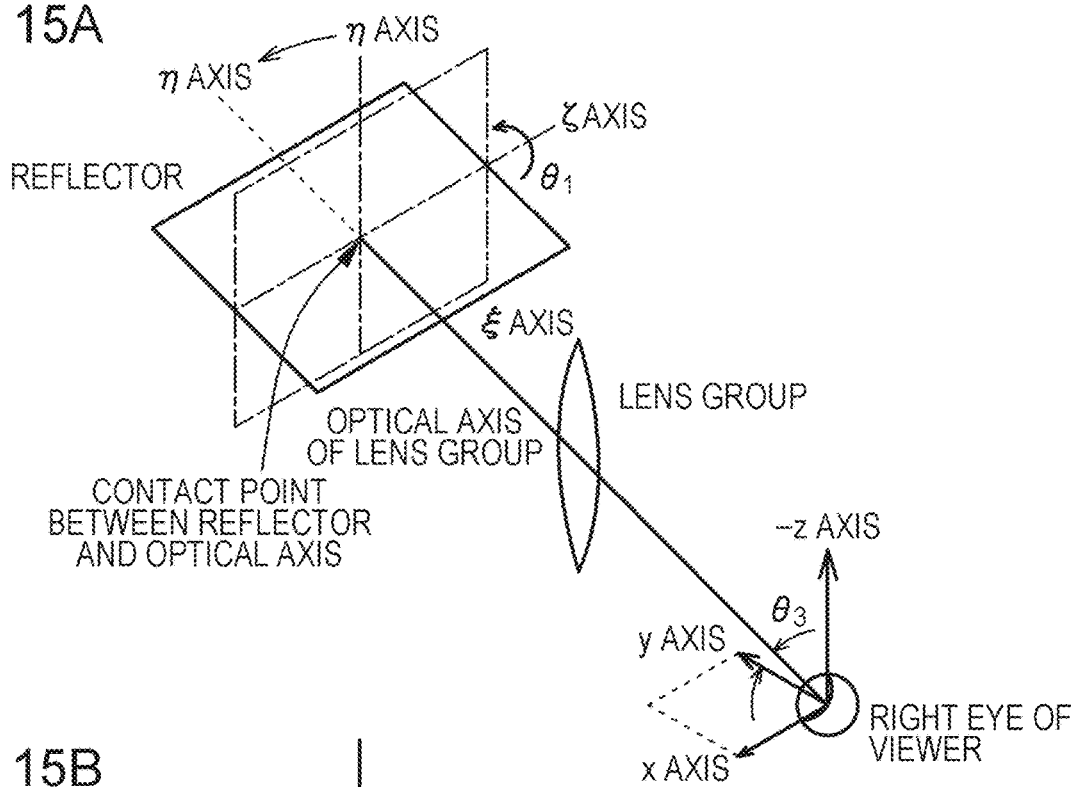
FIGS. 15A and 15B are conceptual diagrams of the reflector and the like illustrating a state where the reflector constituting the optical system is disposed, in continuation of FIG. 14.
Figure 15B:
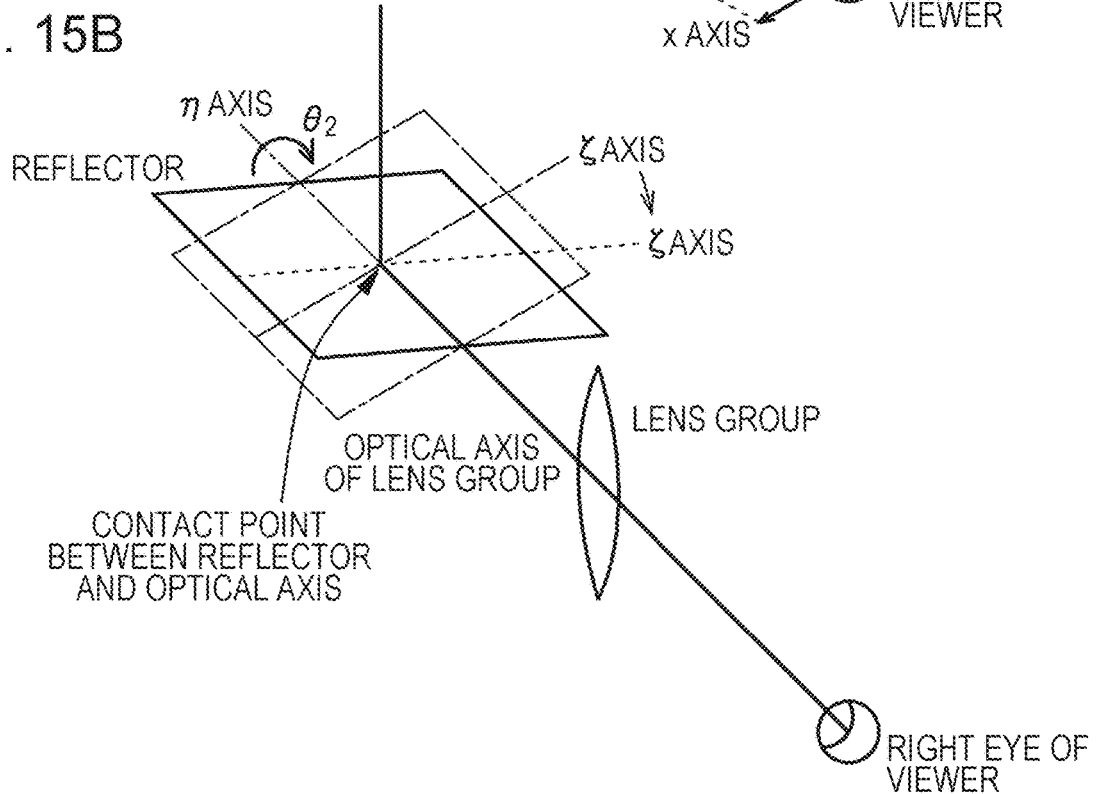

Hereinafter, arrangement of the reflector will be described with reference to FIGS. 14, 15A, and 15B. Here, the following assumptions are made: an imaginary plane including both pupils of a viewer and the infinity is an xy plane; a straight line connecting both the pupils of the viewer is an x axis (specifically, the x axis is a straight line connecting both of the pupils of the viewer and an axis line extending from the right eye pupil of the viewer toward the left eye pupil); an optical axis of the right eye of the viewer is a y axis (specifically, the y axis is an axis line which extends toward the lens group orthogonal to the x axis); a point on the reflector, at which an optical axis (main optical axis) of the lens group constituting the optical system of the right-eye image display device comes into contact with the reflector is a "contact point between the right eye reflector and the optical axis"; and the reflector constituting the optical system of the right-eye image display device is disposed in parallel with (perpendicular to) an xz plane (refer to FIG. 14). Further, the following assumptions are made: an axis line on the reflector passing through the contact point between the right eye reflector and the optical axis in parallel with the xy plane is a ζ axis; and an axis line on the reflector passing through the contact point between the right eye reflector and the optical axis perpendicular to the ζ axis is a η axis (refer to FIG. 14). Under these assumptions, a planar mirror constituting the optical system of the right-eye image display device is rotated about the ζ axis by an angle $θ_1=45±5$ degrees, and is disposed such that the upper side of the planar mirror is rotated in a direction of separating from the viewer (regarding a state of the reflector and the axis line before the rotation, refer to the chain lines of FIG. 15A, and regarding a state of the reflector and the axis line after the rotation, refer to the solid lines and the dotted lines of FIG. 15A). In addition, the planar mirror is rotated about the η axis by an angle $θ_2=7$ to 21 degrees, and is disposed such that the right end of the planar mirror is rotated in a direction of separating from the viewer (regarding a state of the reflector and the axis line before the rotation, refer to the chain lines of FIG. 15B, and regarding a state of the reflector and the axis line after the rotation, refer to the solid lines and the dotted lines of FIG. 15B). The image forming device and the optical system of the left-eye image display device may be disposed to be mirror symmetric to the image forming device and the optical system of the right-eye image display device with respect to an imaginary plane which passes through the center of the line connecting both the pupils of the viewer in parallel with the yz plane. Furthermore, assuming that an axis line perpendicular to the ζ and η axes is an ξ axis, relationships of the angles $θ_1$, $θ_2$, and $θ_3$ are shown in the following Table 1. The angle $θ_3$ is an angle formed between the y axis and an ξ' axis which is an axis line obtained when the ξ axis is projected on the xy plane. Regarding the angle $θ_3$, an angle on a quadrant (−x, y) is set to a positive value (refer to FIGS. 14 and 15A). It is preferable that the optical axis (main optical axis) of the lens group intersect with the center of the pupil of the viewer. In addition, in such a preferred embodiment, it is preferable that the image forming device be disposed above the reflector.

TABLE 1

| $θ_1$ (DEGREES) | $θ_2$ (DEGREES) | $θ_3$ (DEGREES) |
|---|---|---|
| 45 | 5 | 9 |
| 45 | 10 | 15 |
| 45 | 15 | 22 |

TABLE 1-continued

| θ$_1$ (DEGREES) | θ$_2$ (DEGREES) | θ$_3$ (DEGREES) |
|---|---|---|
| 45 | 18 | 25 |
| 45 | 20 | 29 |

TABLE 2

| DIOPTER VALUE | RADIUS OF SIDE SURFACE OF CYLINDER |
|---|---|
| −3 | 59 mm |
| −2 | 68 mm |
| −1 | 80 mm |
| 0 | 100 mm |

Furthermore, the following assumptions are made: a point, at which the optical axis of the lens group comes into contact with the image forming device after being reflected by the reflector, is the contact point between the image forming device and the optical axis; an imaginary plane in contact with the contact point between the image forming device and the optical axis is an XY plane; an outer shape of the display region of the image forming device is a rectangular shape; the X and Y directions are orthogonal; an axis passing through the contact point between the image forming device and the optical axis in parallel with the X direction is an X axis, and an axis passing through the contact point in parallel with the Y direction is a Y axis; and (X, Y, Z) coordinates of the contact point between the image forming device and the optical axis are (0, 0, 0). Then, when X>0, a value of $(dZ/dX)_{Y=0}$ may be positive (that is, at Y=0, when a value of X increases, a value of Z may simply increase), and at Y=0, when the value of $(dZ/dX)_{Y=0}$ is an arbitrary value and the value of X increases, the value of Z may increase eventually. Likewise, when Y>0, a value of $(dZ/dY)_{X=0}$ may be positive (that is, at X=0, when a value of Y increases, the value of Z may simply increase), and at X=0, when the value of $(dZ/dY)_{X=0}$ is an arbitrary value and the value of Y increases, the value of Z may increase eventually. Examples of the curved shape of the image forming device may include a curved surface represented by the aspheric function, a spherical surface, a spheroid, a hyperboloid of revolution, and a paraboloid of revolution. Alternatively, when the curved shape of the image forming device is represented by the functions of $Z_X = f(X)_{Y=0}$ and $Z_Y = f(Y)_{X=0}$, examples of such functions may include a circle, an ellipse, a hyperbola, a parabola, an aspheric function, a 3-or-higher-order polynomial, a bifolium, a trifolium, a quadrifolium, a lemniscate, a limacon, a simple folium, a conchoid, a cissoid, an expectancy curve, a tractrix, a catenary, a cycloid, a trochoid, an astroid, a half cubic parabola, a Lissajous curve, an Agnesi curve, an epicycloid, a cardioid, a hypocycloid, a clothoid curve, and a spiral. Alternatively, for example, the image forming device may be curved to follow a side surface of a cylinder. When the degree of the curvature of the image forming device is represented by an average radius of curvature, a value of the average radius of curvature may be constant or may be variable.

By providing the display apparatus having the image display devices in which the degrees of the curvature of the image forming devices are different, it may be possible to provide the display apparatus appropriate for eyesight of a viewer, and the display apparatus may have a configuration or structure in which the degree of the curvature of the image forming device is variable. Assuming that the image forming device is curved to follow the side surface of the cylinder, relationships between diopter values and radii of the side surface of the cylinder are shown in the following Table 2, but are not limited to this.

EXAMPLE 1

Figure 2A:
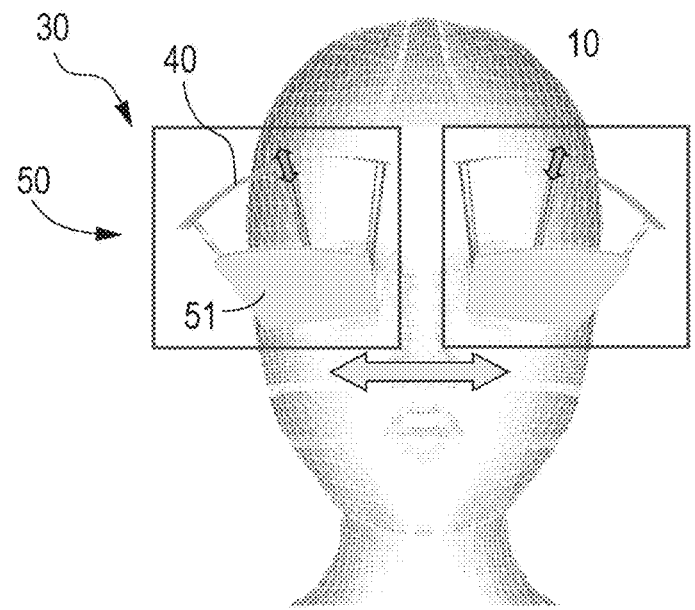
FIGS. 2A and 2B are respectively a perspective view of main sections of a display apparatus of Example 1 as the viewer who wears the display apparatus is viewed from the front, and a perspective view of the main sections of the display apparatus as the viewer who wears the display apparatus is viewed from the side.
Figure 2B:
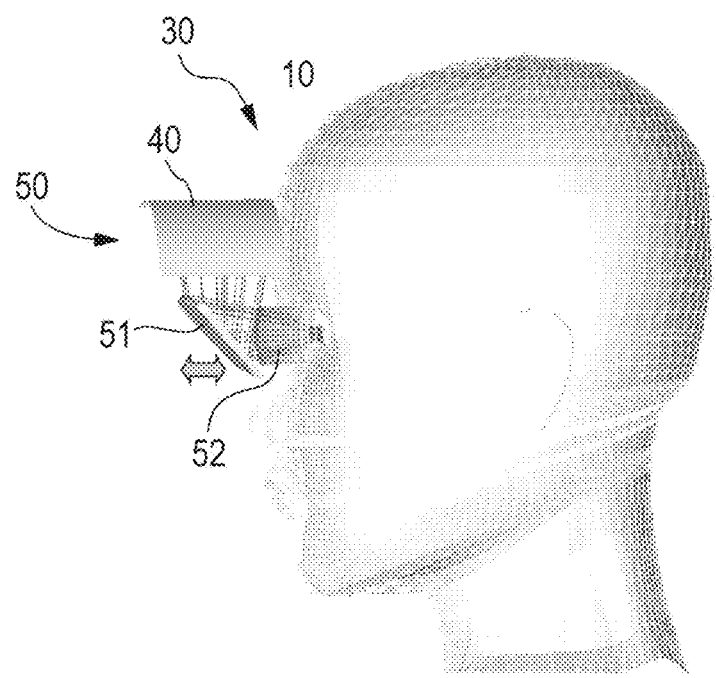
Figure 3A:
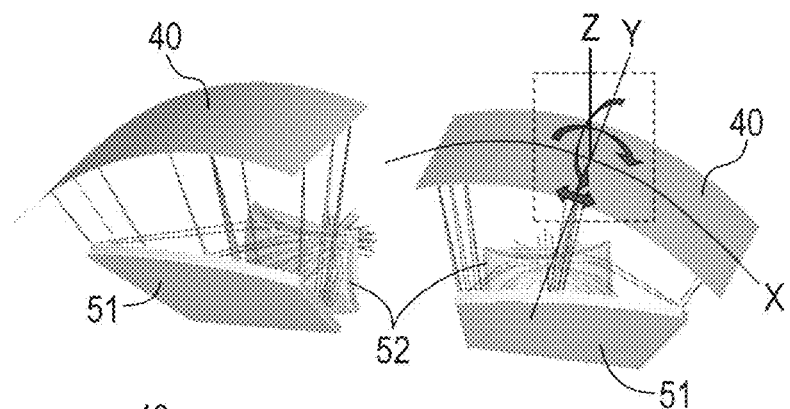
FIGS. 3A and 3B are respectively a perspective view of the main sections as an image forming device and an optical system are viewed toward the viewer, and a perspective view of the main sections as the image forming device and the optical system are viewed from the viewer, in the display apparatus of Example 1.
Figure 3B:
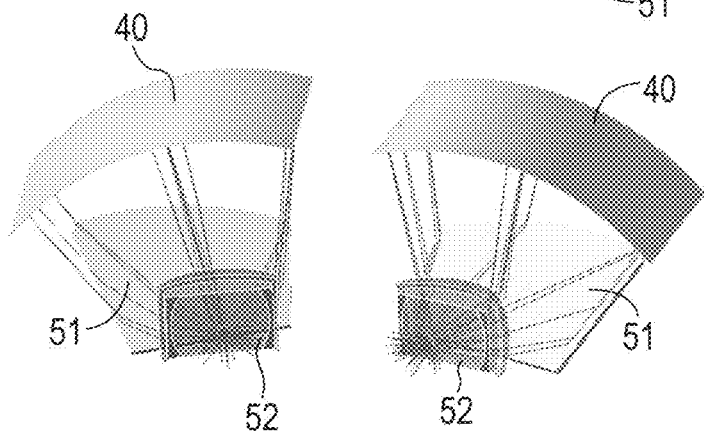
Figure 5A:
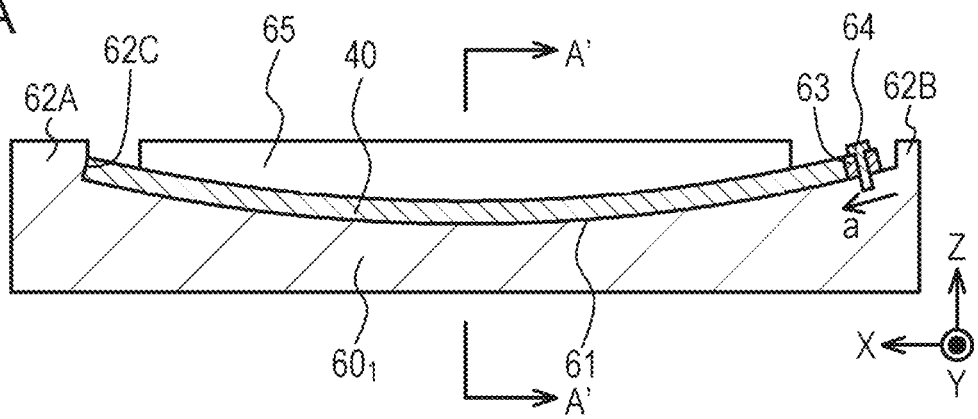
FIG. 5A is a schematic cross-sectional view of a supporting member and an image forming device constituting the display apparatus of Example 1.
Figure 5B:
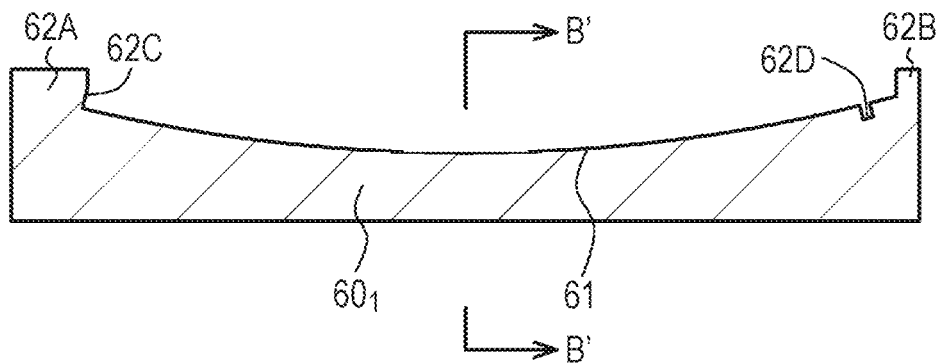
FIG. 5B is a schematic cross-sectional view of the supporting member.
Figure 5C:
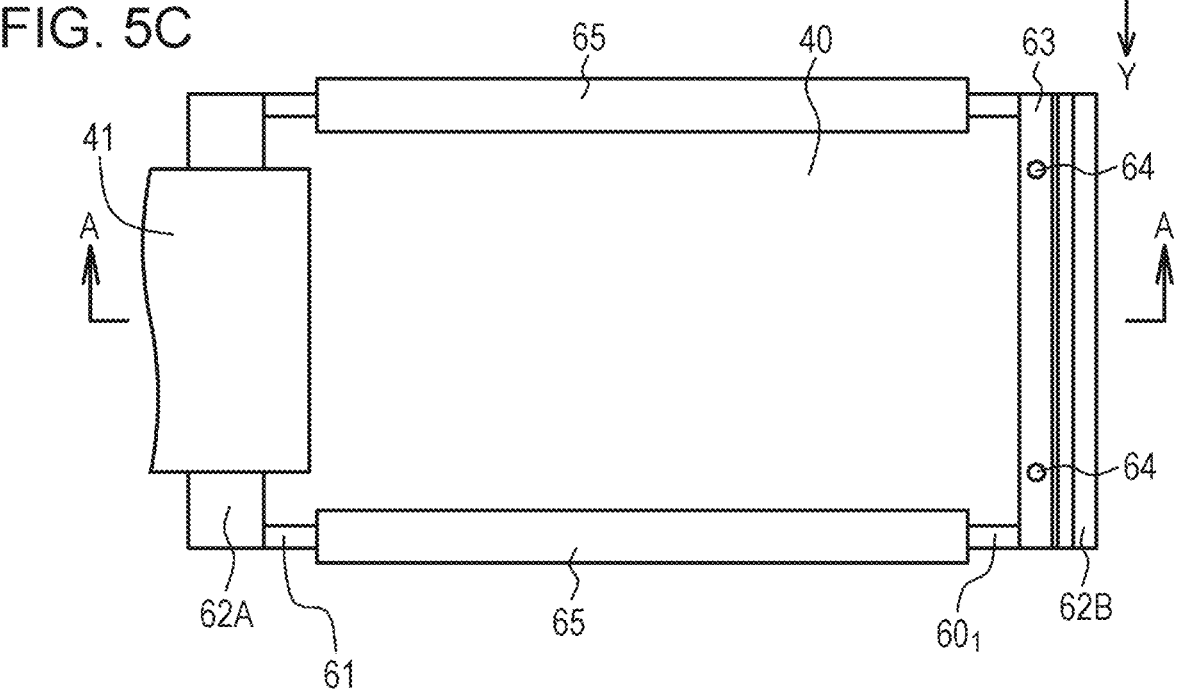
FIG. 5C is a schematic plan view of the supporting member and the image forming device.
Figure 6A:
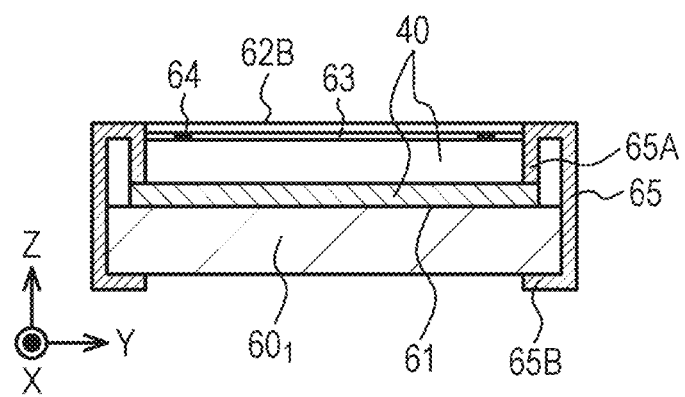
FIGS. 6A and 6B are a schematic cross-sectional view of the supporting member and the image forming device constituting the display apparatus of Example 1, along the arrow A'-A' of FIG. 5A, and a schematic cross-sectional view of the supporting member, along the arrow B'-B' of FIG. 5B.
Figure 6B:
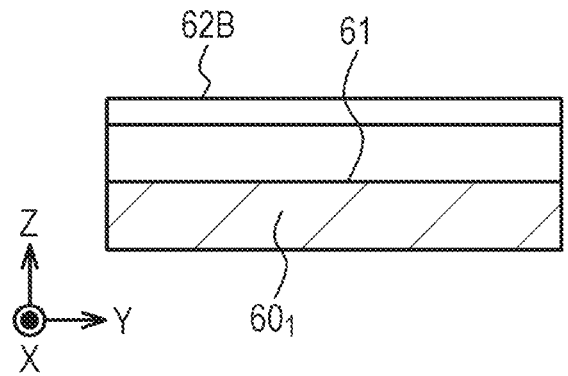
Figure 9:
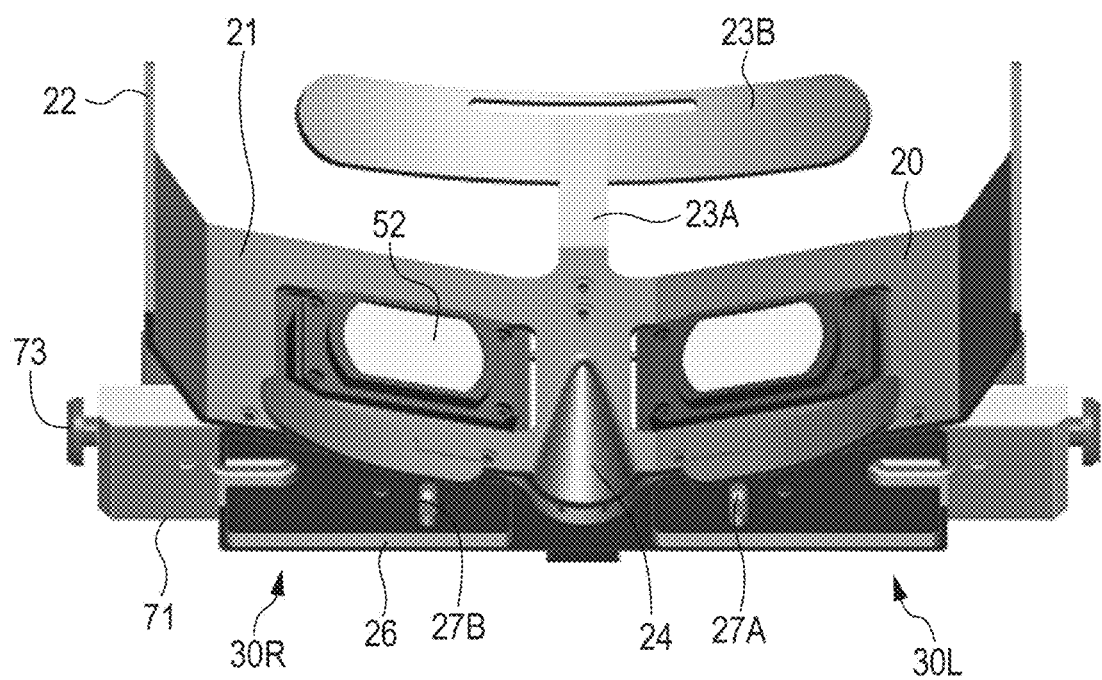
FIG. 9 is a perspective view of a part of the display apparatus of Example 1.

Example 1 relates to the display apparatus according to the first and second embodiments of the present disclosure and the image display device according to the first and second embodiments of the present disclosure. FIG. 1 shows a perspective view of main sections of the display apparatus when a viewer wears the display apparatus. FIG. 2A shows a perspective view of the main sections of the display apparatus as the viewer who wears the display apparatus is viewed from the front. FIG. 2B shows a perspective view of the main sections of the display apparatus as the viewer who wears the display apparatus is viewed from the side. FIG. 3A shows a perspective view of the main sections as the image forming device and the optical system are viewed toward the viewer. FIG. 3B shows a perspective view of the main sections as the image forming device and the optical system are viewed from the viewer. FIGS. 5A and 6A show schematic cross-sectional views of the supporting member and the image forming device. FIGS. 5B and 6B show schematic cross-sectional views of the supporting member. FIG. 5C is a schematic plan view of the supporting member and the image forming device. FIGS. 5A and 5B are schematic cross-sectional views taken along the arrow A-A of FIG. 5C. FIGS. 6A and 6B are schematic cross-sectional views taken along the arrow A'-A' of FIG. 5A and the arrow B'-B' of FIG. 5B. FIG. 9 shows a perspective view of a part of the display apparatus of Example 1. However, in FIG. 9, the reflector, the image forming device, and the like are not shown. FIGS. 10A, 10B, 10C, and 10D show a bottom view, a top view, a right side view, and a back view of the display apparatus of Example 1. However, for the sake of simplicity of drawings, some elements of the image forming device and the display apparatus are not shown.

The display apparatus of Example 1 includes (a) a frame 20, and (b) an image display device 30 that is mounted on the frame 20. In addition, the image display device 30 of the display apparatus of Example 1, or the image display device 30 of Example 1 includes (A) an image forming device 40, and (B) an optical system 50 that guides an image, which originates from the image forming device 40, into a pupil of a viewer 10. Here, the frame 20 of the display apparatus of Example 1 is mounted on a head part of the viewer 10, and the display apparatus of Example 1 is, more specifically, a head mounted display (HMD). In addition, assuming that a direction of the image forming device 40 corresponding to a first direction (specifically, the horizontal direction of the image) of the image is an X direction and a direction of the image forming device 40 corresponding to a second direction (specifically, the vertical direction of the image) of the image different from the first direction is a Y direction, the image forming device 40 is curved along the X direction, the Y direction, or the X and Y directions. Specifically, in Example 1, the image forming device 40 is curved along the X direction. It should be noted that, in the drawings, the image forming device 40 is shaded, but the shading has no particular meaning.

In addition, in the display apparatus of Example 1, the image display device 30 further includes an image-forming-device-to-optical-system distance adjustment unit 90 that adjusts a distance between the image forming device 40 and the optical system 50. Alternatively, the image display device 30 further includes a pupil-to-optical-system distance adjustment unit 80 that adjusts a distance between the optical system 50 and the pupil of the viewer 10.

Here, in the display apparatus of Example 1, the optical system 50 is formed of a reflector 51, which reflects the image obtained from the image forming device 40, and a lens group 52 into which the image reflected by the reflector 51 is incident. The lens group 52 is disposed between the pupil of the viewer 10 and the reflector 51, and the image forming device 40 is disposed above the reflector 51. Specifically, the pupil-to-optical-system distance adjustment unit 80 adjusts a distance between the lens group 52 and the pupil of the viewer 10.

The image display device 30 further includes a supporting member $60_1$ which supports the image forming device 40. In addition, a supporting surface 61 of the supporting member $60_1$, which supports the image forming device 40, is curved along the X direction, the Y direction, or the X and Y directions (specifically, in Example 1, the surface is curved along the X direction). Thereby, the image forming device 40 is curved. More specifically, the image forming device 40 is curved to follow the supporting surface 61 of the supporting member $60_1$. In addition, an outer shape of the image forming device 40 and an outer shape of the display region of the image forming device 40 are rectangular shapes. Specifically, in the display apparatus or the image display device 30 of Example 1, a degree of a curvature of the supporting surface 61 of the supporting member $60_1$ along the X direction is greater than a degree of a curvature thereof along the Y direction. In addition, in the display apparatus or the image display device 30 of Example 1, when X>0, the value of $(dZ/dX)_{Y=0}$ is positive. That is, at X>0 and Y=0, when the value of X increases, the value of Z simply increases. Further, $(dZ/dY)_{X=0}=0$. Specifically, since the image forming device 40 is curved to follow a side surface of a cylinder, the radius of the side surface of the cylinder is 100 mm. That is, when the degree of the curvature is represented by the average radius of curvature, the average radius of curvature of the supporting surface of the supporting member along the X direction is less than the average radius of curvature thereof along the Y direction. Specifically, the average radius of curvature of the supporting surface of the supporting member along the X direction is 100 mm, and the radius of curvature thereof along the Y direction is infinite. Further, as described later, an effective focal length of the lens group 52 is 56 mm. In addition, preferable relationships between the radii of the side surface of the cylinder and the effective focal lengths of the lens group 52 are shown in the following Table 3.

TABLE 3

| RADIUS OF SIDE SURFACE OF CYLINDER (mm) | EFFECTIVE FOCAL LENGTH OF LENS GROUP 52 (mm) |
| --- | --- |
| 50 | 28 |
| 100 | 56 |
| 146 | 67 |
| 238 | 95 |

In addition, in the display apparatus or the image display device 30 of Example 1, the supporting member $60_1$ includes a pressing member 65, the outer shape of the image forming device 40 is a rectangular shape as described above, and an outer peripheral portion of the image forming device 40, which extends along the X direction, is fixed onto the supporting member $60_1$ by the pressing member 65.

More specifically, the supporting member $60_1$ and the pressing member 65 are made of aluminum. The center portion of the upper surface of the supporting member $60_1$ corresponds to the supporting surface 61, and outer peripheral portions 62A and 62B of the supporting member $60_1$ extending along the Y direction are more protruded than the supporting surface 61. A portion of the outer peripheral portion 62A facing the supporting surface 61 is a contact surface 62C, and one edge portion of the image forming device 40 extending along the Y direction may be brought into contact with the contact surface 62C. Further, a fixing member 63 made of aluminum is fixed onto the upper surface of the supporting member $60_1$ by a screw 64 threadedly engaged on a threaded portion 62D which is formed on the upper surface of the supporting member $60_1$, and is in contact with the other edge portion of the image forming device 40 extending along the Y direction. A long hole (long hole elongated in the X direction) through which the screw 64 is threaded is provided on the fixing member 63. Here, the fixing member 63 exerts compressive force on the image forming device 40 in a direction of the arrow "a" of FIG. 5A. Thereby, the image forming device 40 is curved without a gap so as to follow the supporting surface 61 of the supporting member $60_1$.

One end portion 65A of the pressing member 65 presses the outer peripheral portion of the image forming device 40 extending along the X direction, and the other end portion 65B of the pressing member 65 is engaged on a bottom surface of the supporting member $60_1$ extending along the X direction. Thereby, the outer peripheral portion of the image forming device 40 extending along the X direction is fixed onto the supporting member $60_1$ by the pressing member 65.

In addition, in some cases, the lower surface of the image forming device 40 and the supporting surface 61 of the supporting member $60_1$ may be fixed using an adhesive. In this case, the pressing member 65 may be omitted.

Further, a wiring 41, specifically, a flexible print wiring board (FPC), extends outward from the outer peripheral portion of the image forming device 40 extending along the Y direction. The wiring 41 and a connection portion, which is provided on the outer peripheral portion of the image forming device 40, may be connected on the basis of a well-known method. FIG. 5C shows a state where the wiring 41 extends from one side of the outer peripheral portion of the image forming device 40 extending along the Y direction. However, the wiring 41 may extend from both sides of the outer peripheral portion of the image forming device 40 extending along the Y direction.

In the display apparatus of Example 1, specifically, the image forming device 40 includes an organic electroluminescent display device (organic EL display device) having a well-known configuration or structure. In addition, the organic EL display device includes a first substrate, a second substrate, and multiple light emitting portions sandwiched between the first substrate and the second substrate. A thickness of the image forming device 40 is a thickness at which the device can be curved without a gap so as to follow the supporting surface of the supporting member $60_1$, and is, for example, 0.5 mm or less, for example, in a range of 0.2 mm to 0.5 mm. Further, the number of pixels is set as 1920×1080.

As shown in FIGS. 9, 10A, 10B, 10C, and 10D, the display apparatus of Example 1 includes a left-eye image display device 30L and a right-eye image display device 30R. A horizontal viewing angle (monocular viewing angle) of each image display device 30 is set to 100 degrees, overlap (binocular viewing angle) between a horizontal view of the left-eye image display device 30L and a horizontal view of the right-eye image display device 30R is set to 70 degrees, and a total horizontal viewing angle is set to 130 degrees. The length $L_X$ of the display region of each image forming device 40 along the X direction is set to 100 mm. Further, the vertical viewing angle is set to 44 degrees. In addition, assuming that a mass of the lens group in this case is "1", when the monocular viewing angle is set to 120 degrees, the binocular viewing angle is set to 70 degrees, the total horizontal viewing angle is set to 170 degrees, and the length $L_X$ of the display region of each image forming device 40 is set to 126 mm, the mass of the lens group is "4.6", and the effective focal length is 67.2 mm.

The frame 20 mounted on the head part of the viewer 10 is made of plastic, and is formed of a front part 21, which is disposed in front of the viewer 10, and side parts 22 which extend from both ends of the front part. Holes 22A are provided on rear end portions of the side parts 22, and the frame 20 can be mounted on the head part of the viewer 10 by passing a belt through the holes 22A and winding the belt around a rear portion of the head part of the viewer. An arm 23A extends upward from the upper side of the front part 21, and a forehead contact part 23B, which comes into contact with a forehead of the viewer 10, is mounted on a leading end portion of the arm 23A. Further, a nose padding portion 24 is disposed on the front part 21. Furthermore, rear portions of holding members 25 are mounted on a lower end portion of the front part 21, and bases 26 are mounted on the front portions of the holding members 25. Moreover, the pupil-to-optical-system distance adjustment unit 80 to be described later is mounted on the leading end portion of the base 26, and a pedestal 71 constituting the pupil-to-optical-system distance adjustment unit 80 is disposed on the base 26 to be slidable in a front-back direction. An optical system 50L constituting the left-eye image display device 30L is housed in a casing 53L, and an optical system 50R constituting the right-eye image display device 30R is housed in a casing 53R. The left-eye image display device 30L is mounted on the casing 53L, and the left-eye image display device 30R is mounted on the casing 53R. The casings 53L and 53R are mounted on the pedestals 71. As described later, the optical system 50L and the left-eye image display device 30L, and the optical system 50R and the right-eye image display device 30R are respectively separately disposed on the pedestals 71 so as to be slidable in the left-right direction. It should be noted that the "front-back direction" means a direction in which the lens group approaches or separates from the pupil, and "left-right direction" means a direction in which the left-eye image display device and the right-eye image display device approach or separate from each other.

As described above, the optical system 50 is formed of the reflector 51, which reflects the image obtained from the image forming device 40, and the lens group 52 into which the image reflected by the reflector 51 is incident. The reflector 51R and the lens group 52R constituting the right-eye image display device are mounted on the pedestal 71 through the casing 53R, and are slidable on the base 26 in the left-right direction. Likewise, the reflector 51L and the lens group 52L constituting the left-eye image display device are mounted on the pedestal 71 through the casing 53L, and are slidable on the base 26 in the left-right direction. The lens group 52 (52R or 52L) is disposed between the pupil of the viewer 10 and the reflector 51 (51R or 51L), and the image forming device 40 is disposed above the reflector 51. Regarding the above-mentioned angles $\theta_1$ and $\theta_2$, $\theta_1$=45±5 degrees, and $\theta_2$=7 to 21 degrees, and a contact point between the reflector and the optical axis is included in the above-mentioned xy plane.

The lens group 52 is formed of a group of three lenses, a second lens thereof has a negative power, and a refractive index of a material of the second lens is greater than refractive indexes of materials of first and third lenses. The first and third lenses have positive powers. Further, the second lens is a meniscus lens. Specifically, the effective focal length of the lens group 52 is set to 56.01 mm, a back focal length is set to 44.64 mm, a front focal length is set to −32.16 mm, and an F number is set to 14.0. A horizontal length of the lens group 52 is set to 36 mm, and a vertical length thereof is set to 20 mm. Specifications of the first lens (a lens closest to the pupil), the second lens, and the third lens (a lens closest to the reflector) are shown in the following Table 4, but are not limited to this. The lens group 52 is a telecentric optical system, specifically, an optical system which is telecentric on the reflector side. A distance between the first lens and the pupil (pupil diameter: 4 mm) of the viewer 10 is set to 10 mm. It should be noted that, assuming that the mass of the lens group is "1", when the distance between the first lens and the pupil of the viewer 10 is set to 12 mm, the mass of the lens group is "1.7".

TABLE 4

| | FIRST LENS | SECOND LENS | THIRD LENS |
|---|---|---|---|
| REFRACTIVE INDEX | 1.740 | 2.017 | 1.740 |
| ABBE NUMBER | 44.8438 | 20.830 | 44.8438 |
| EFFECTIVE FOCAL LENGTH | 27.392 mm | −43.604 mm | 150.185 mm |
| BACK FOCAL LENGTH | 28.101 mm | −45.387 mm | 146.790 mm |
| FRONT FOCAL LENGTH | −11.141 mm | 52.856 mm | −124.868 mm |
| F NUMBER | 6.8480 | −10.9010 | 37.5463 |

Figure 12A:
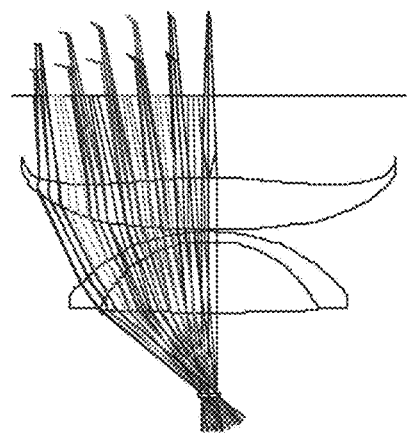
FIGS. 12A, 12B, and 12C are respectively diagrams illustrating how images from the image forming device are formed by various lens groups.
Figure 12B:
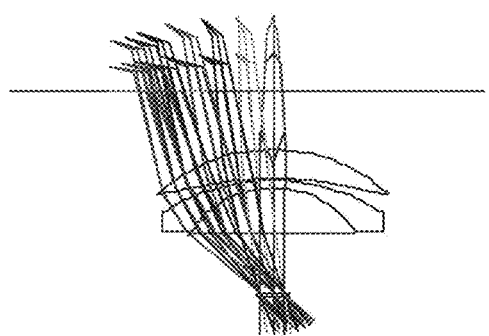
Figure 12C:
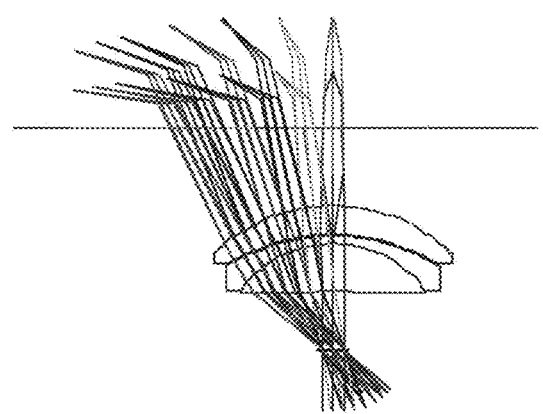

FIGS. 12A, 12B, and 12C show how images from the image forming device 40 are formed by various lens groups. However, the lens group shown in FIG. 12A is a lens group of the telecentric optical system, FIG. 12B is a lens group having a configuration close to the telecentric optical system, and FIG. 12C is a normal lens group. In Example 1, the lens group shown in FIG. 12A is used.

The display apparatus of Example 1 further includes an image display device distance adjustment unit 70 that adjusts a distance between the left-eye image display device 30L and the right-eye image display device 30R. Specifically, the image display device distance adjustment unit 70 includes: the pedestals 71; lead screw mechanisms 73 that are mounted on side surfaces 72 positioned on the outsides of the pedestals 71; tap holes 75A that fix the casings 53 against the lower side by holding force so as to be capable of sliding the pedestals 71; guide grooves 74B and 76B that are provided on the casings 53; guide grooves 75B that are provided on the pedestals 71; and pins 74A and 76A that are provided on the pedestals 71 and are engaged with the guide grooves 74B and 76B. It should be noted that the guide grooves 75B, 75B, and 76B extend in the left-right direction. In addition, when the lead screw mechanism 73 is rotated, the casing 53 (casing 53L or casing 53R) moves in the left-right direction relative to the base 26. The movement of the casing 53 is reliably performed in the left-right direction through engagement between the guide grooves 74B, 75B, and 76B and the pin 74A, the tap hole 75A, and the pin 76A. The movement distance of the casing 53L or 53R in the horizontal direction is set to ±5 mm. As described above, by providing the image display device distance adjustment unit 70, the display apparatus is easily adaptable to viewers having different inter-pupil distances. Instead of the lead screw mechanism 73, a combination of a latch mechanism and a knob, that is, a rack-and-pinion mechanism, may be used. The casing 53R or 53L extends further upward than shown in FIGS. 10A, 10B, 10C, and 10D, and the supporting member $60_1$, which supports the image forming device 40, and the like are mounted on a part of the casing 53R or 53L extending upward (detailed description will be described later), but are not shown in the drawings.

The display apparatus of Example 1 further includes the pupil-to-optical-system distance adjustment unit 80 that adjusts a distance between the lens group 52 and the pupil of the viewer 10. Specifically, the pupil-to-optical-system distance adjustment unit 80 includes: a side wall 82 that is mounted on the leading end portion of the second holding member 26; a lead screw mechanism 83 that is mounted on the side wall 82; buttons 27A that are provided on the pedestals 71 and extend downward from the pedestals 71; guide grooves 27B that are provided on the bases 26 and engage with the buttons 27A; and fastening portions 27C that hold the pedestals 71 such that the pedestals 71 are slidable toward the base 26. When the lead screw mechanism 83 is rotated, the pedestal 71 moves in the front-back direction relative to the base 26. The movement of the pedestal 71 is reliably performed in the front-back direction through engagement between the button 27A and the guide groove 27B. The movement distance of the pedestal 71 in the front-back direction is set to ±4 mm. As described above, by providing the pupil-to-optical-system distance adjustment unit 80, the display apparatus is easily adaptable to viewers having different distances between the pupil and the lens group. Instead of the lead screw mechanism 83, combination of the latch mechanism and the knob, that is, the rack-and-pinion mechanism, may be used.

Figure 11A:
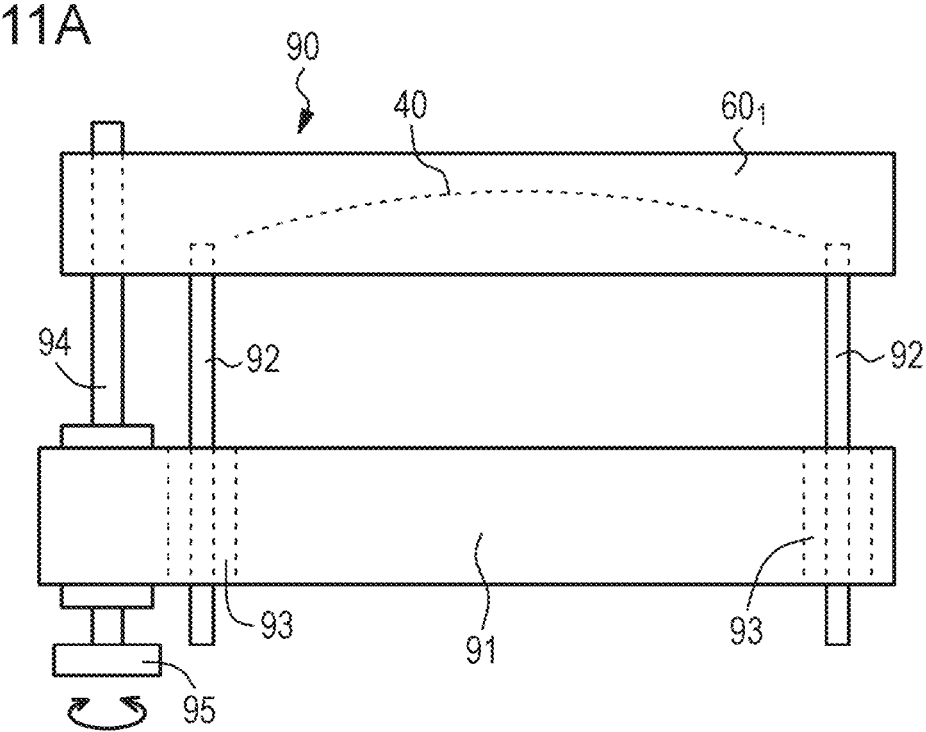
FIGS. 11A and 11B are schematic diagrams of an image-forming-device-to-optical-system distance adjustment unit.

As described above, the supporting member $60_1$, which supports the image forming device 40, and the like are mounted on a part of the casing 53R or 53L extending upward. The image-forming-device-to-optical-system distance adjustment unit 90 includes, as shown in FIG. 11A, for example, an adjustment unit base member 91, shafts 92 that are mounted on the supporting member $60_1$, a lead screw mechanism 95 that is mounted on the adjustment unit base member 91, and a shaft 94 that extends from the lead screw mechanism 95 and is mounted on the supporting member $60_1$. The supporting member $60_1$ causes the shafts 92 to be slidable through bushes 93, and is able to change a distance between the adjustment unit base member 91 and itself. In addition, the adjustment unit base member 91 is mounted on a part of the casing 53R or 53L extending upward. By rotating the lead screw mechanism 95, as a result of movement of the shaft 94 in the up-down direction of the drawing, it is possible to change the distance between the adjustment unit base member 91 and the supporting member $60_1$. The movement of the supporting member $60_1$ in the up-down direction of the drawing is regulated by the shafts 92 through the bushes 93.

Figure 11B:
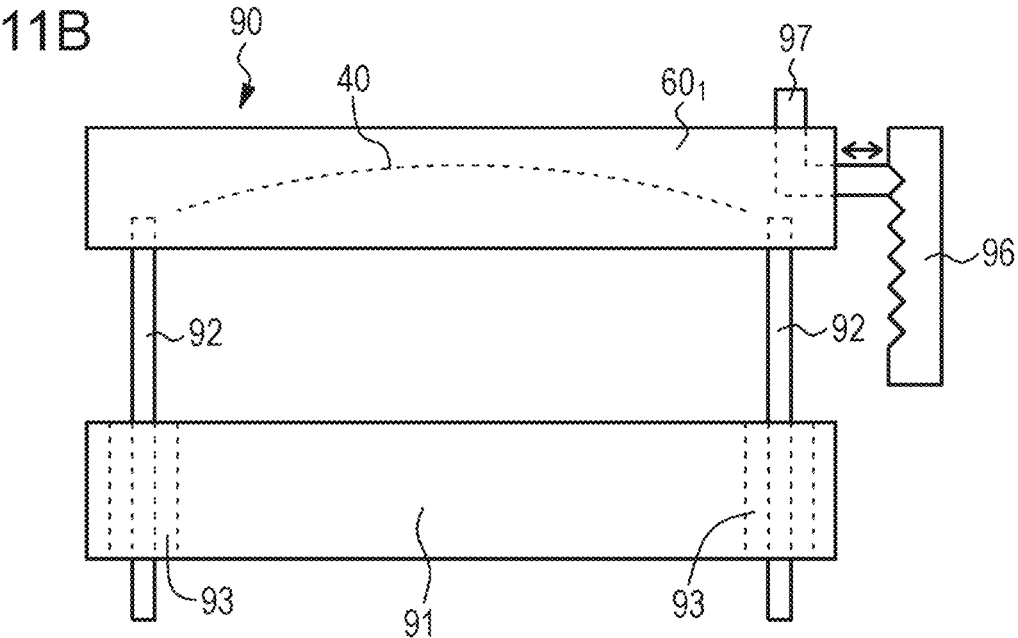

Alternatively, the image-forming-device-to-optical-system distance adjustment unit 90 includes, as shown in FIG. 11B, for example, a latch mechanism 96 and a pin 97 fitted onto the latch mechanism. In addition, by moving the pin 97 in the direction left of the drawing (refer to the arrow of FIG. 11B), the fitting between the pin 97 and the latch mechanism 96 is released. In addition, after the supporting member $60_1$ is moved in the up-down direction of the drawing, by moving the pin 97 in the direction right of the drawing, the pin 97 is fitted onto the latch mechanism 96.

As described above, by using the image-forming-device-to-optical-system distance adjustment unit 90 shown in FIG. 11A or 11B, a distance between the image forming device 40 and the optical system 50 (specifically, reflector 51) can be adjusted and controlled in accordance with eyesight of the viewer. However, the image-forming-device-to-optical-system distance adjustment unit 90 shown in FIG. 11A or 11B is an example, and any type device can be used if the device is able to adjust the distance between the image forming device and the optical system. For example, instead of the bushes 93, linear guide rails may be used, and a restraint mechanism between two planes disposed at a right angle may be used. Further, instead of the lead screw mechanism 95 or the latch mechanism 96, the rack-and-pinion mechanism may be used.

For the distance between the image forming device 40 and the optical system 50, a distance detection device, which detects the distance between the image forming device 40 and the optical system 50, may be disposed on the image-forming-device-to-optical-system distance adjustment unit 90. It is preferable that the distance detection device be an appropriate device which depends on the configuration or structure of the image-forming-device-to-optical-system distance adjustment unit 90. Specifically, for example, the distance detection device may be a device that detects a position (angle) of the lead screw mechanism 95, or a device that detects which position on the latch mechanism 96 the pin 97 is at.

In addition, the display apparatus of Example 1 further includes a display control device (not shown in the drawing) that controls a size of the entire image obtained from the image forming device 40 in accordance with the distance between the image forming device 40 and the optical system 50 (specifically, the reflector 51). That is, as the distance between the image forming device 40 and the reflector 51 decreases, the size of the entire image obtained from the image forming device 40 decreases. In addition, it is preferable that the size of the entire image be controlled in a well-known method. In the well-known method, the size of the entire image is enlarged and reduced by performing various kinds of signal processing on the image signals used to form an image in the image forming device 40. It is preferable that the distance between the image forming device 40 and the optical system 50 (reflector 51) be detected by the above-mentioned distance detection device.

Figure 4:
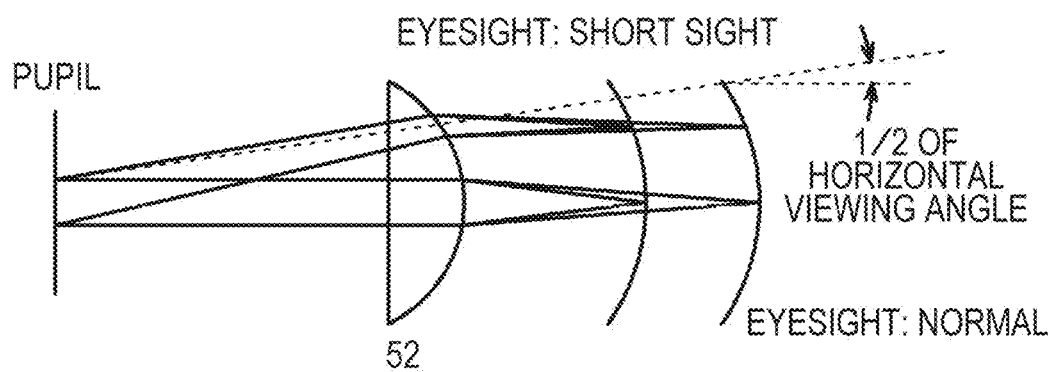
FIG. 4 is a diagram conceptually illustrating a state where an image-forming-device-to-optical-system distance adjustment unit adjusts a distance between the image forming device and the optical system.

FIG. 4 shows a relationship between the size of the entire image and an amount of movement of the image forming device 40 relative to the optical system 50, that is, a state where the image-forming-device-to-optical-system distance adjustment unit adjusts the distance between the image forming device and the optical system. Compared with a case where eyesight of a viewer is normal (diopter value: 0), in a case where the viewer is shortsighted, the distance between the image forming device and the optical system is set to be short. At this time, as shown in Table 5, it is preferable that the size of the entire image obtained from the image forming device 40 be set to be small. Relationships of the diopter value, the amount of movement of the image forming device, and the size of the entire image (the illustrated size) are shown in the following Table 4.

TABLE 5

| DIOPTER VALUE | MOVEMENT AMOUNT | ILLUSTRATED SIZE |
|---|---|---|
| −3 | −9.4 mm | 95.5 mm |
| −2 | −6.3 mm | 97.8 mm |
| −1 | −3.1 mm | 100.3 mm |
| 0 | 0 | 103.4 mm |
| 1 | +3.1 mm | 106.7 mm |
| 2 | +6.3 mm | 110.0 mm |
| 3 | +9.4 mm | 113.8 mm |

When the image forming device 40 (more specifically, the supporting member $60_1$) is installed on a part of the casing 53R or 53L extending upward, in some cases, it may be necessary to finely adjust the installation of the supporting member $60_1$. In addition, the fine adjustment is usually necessary at the time of assembly of the display apparatus. In addition, in such a case, assuming that an axis passing through a predetermined point (contact point between the image forming device and the optical axis) of the image forming device 40 in parallel with the X direction is an X axis and an axis passing through a predetermined point (contact point between the image forming device and the optical axis) of the image forming device 40 in parallel with the Y direction is a Y axis, it is preferable that the image display device 30 further include a rotation device that rotates the image forming device 40 about at least one axis of the X axis, the Y axis, and a Z axis. The rotation device may be, for example, a combination of a pushing screw and a pulling screw mounted on the casing 53R or 53L. In this case, by finely adjusting the pushing screw and the pulling screw, it is possible to finely adjust the installation of the supporting member $60_1$ on a part of the casing 53R or 53L extending upward. Further, when guide grooves are provided on a part of the casing 53R or 53L extending upward and a lead screw mechanism is provided on the supporting member $60_1$, that is, when a movement device formed of the guide grooves and the lead screw mechanism is provided, the image forming device 40 can be moved along the X direction relative to the reflector 51. For example, it is preferable that the image forming device 40 be rotated about the X axis by 40 milliradians, the image forming device 40 be rotated about the Y axis by 40 milliradians, and the image forming device 40 be rotated about the Z axis by 40 milliradians.

The display apparatus or the image display device of Example 1 includes the supporting member of which the supporting surface is curved along the X direction. Therefore, on the basis of the simple configuration or structure, the image forming device can be curved. Specifically, the image forming device can be curved to follow the supporting surface of the supporting member. In addition, since the image forming device is curved, it is possible to decrease the optical path length difference between the optical path length of light, which is emitted from the center portion of the image forming device, and the optical path length of light which is emitted from the outer edge of the image forming device. As a result, for example, it is possible to achieve a large viewing angle while suppressing an increase in the size of the lens group constituting the optical system. Further, since the image display device includes the image-forming-device-to-optical-system distance adjustment unit, despite the simple configuration or structure, it is possible to provide a display apparatus which is appropriately and easily adaptable to the difference in eyesight of a viewer. Furthermore, since the image display device includes the pupil-to-optical-system distance adjustment unit, despite the simple configuration or structure, it is possible to provide a display apparatus which is capable of appropriately and easily adjusting or controlling the difference in the distance between the pupil of the viewer and the lens group.

EXAMPLE 2

Figure 7A:
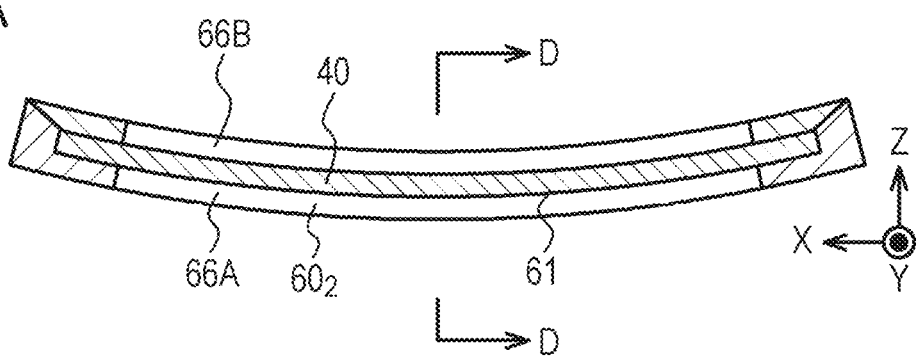
FIG. 7A is a schematic cross-sectional view of a supporting member and an image forming device constituting a display apparatus of Example 2.
Figure 7B:
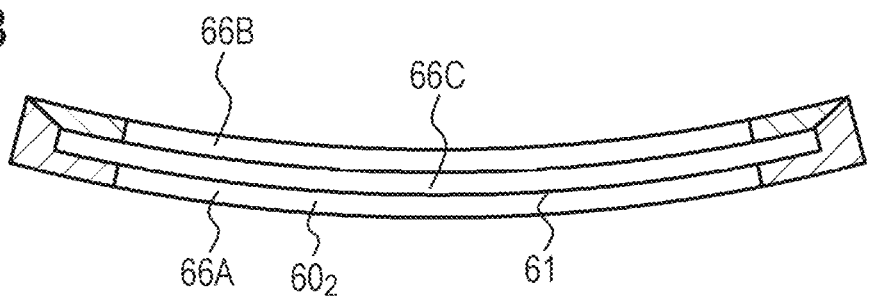
FIG. 7B is a schematic cross-sectional view of the supporting member.
Figure 7C:
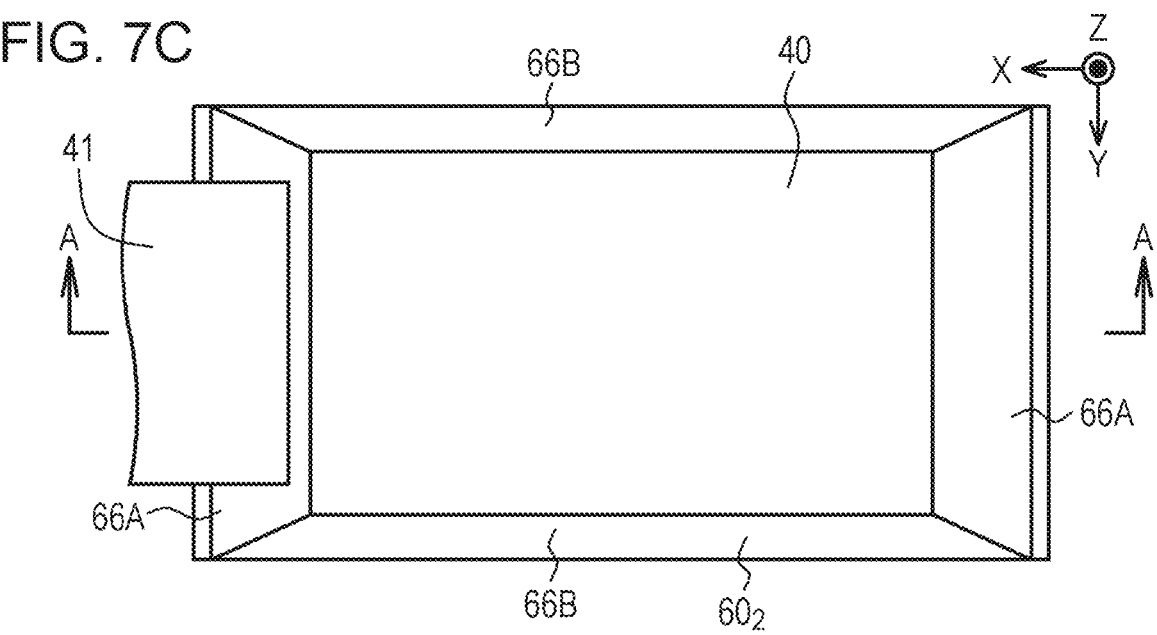
FIG. 7C is a schematic plan view of the supporting member and the image forming device.
Figure 7D:
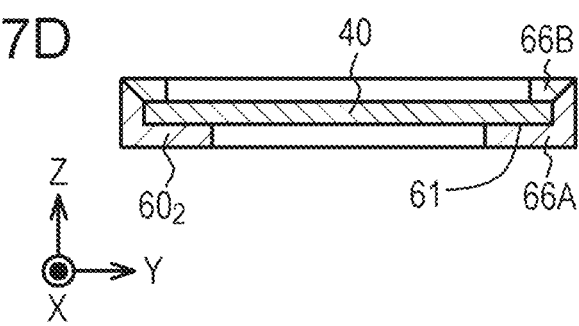
FIG. 7D is a schematic cross-sectional view of the supporting member and the image forming device along the arrow D-D of FIG. 7A.

Example 2 is modification of Example 1. FIG. 7A shows a schematic cross-sectional view of a supporting member and an image forming device constituting the display apparatus of Example 2. FIG. 7B shows a schematic cross-sectional view of the supporting member. FIG. 7C shows a schematic plan view of the supporting member and the image forming device. FIG. 7D shows a schematic cross-sectional view of the supporting member and the image forming device along the arrow D-D of FIG. 7A.

In the display apparatus or the image display device of Example 2, the outer peripheral portion of the image forming device 40 extending along the X direction is pinched by a supporting member $60_2$. The supporting member $60_2$ includes lower side members 66A and upper side members 66B. A combination of the lower side members 66A and the upper side members 66B constitutes a kind of a frame member, and a groove portion 66C is formed on side surfaces of the inside of the supporting member $60_2$. In addition, the outer peripheral portion of the image forming device 40 extending along the X direction is fitted into the groove portion 66C. The lower side member 66A and the upper side member 66B may be fixed onto each other by a screw which is not shown, and may be fixed onto each other using an adhesive. It is preferable that the outer peripheral portion of the image forming device 40 extending along the X direction be fixed into the groove portion 66C by an adhesive. In addition, in the examples shown in the drawings, not only the outer peripheral portion of the image forming device 40 extending along the X direction, but also the outer peripheral portion of the image forming device 40 extending along the Y direction is pinched by the supporting member $60_2$. However, only the outer peripheral portion of the image forming device 40 extending along the X direction may be pinched by the supporting member $60_2$. In this case, it is preferable that the outer peripheral portion of the image forming device 40 extending along the Y direction be fixed onto the supporting member $60_2$ using an adhesive.

Except the above-mentioned points, a configuration or structure of the display apparatus or the image display device of Example 2 is the same as the configuration or structure of the display apparatus or the image display device described in Example 1, and thus detailed description thereof will be omitted.

EXAMPLE 3

Figure 8A:
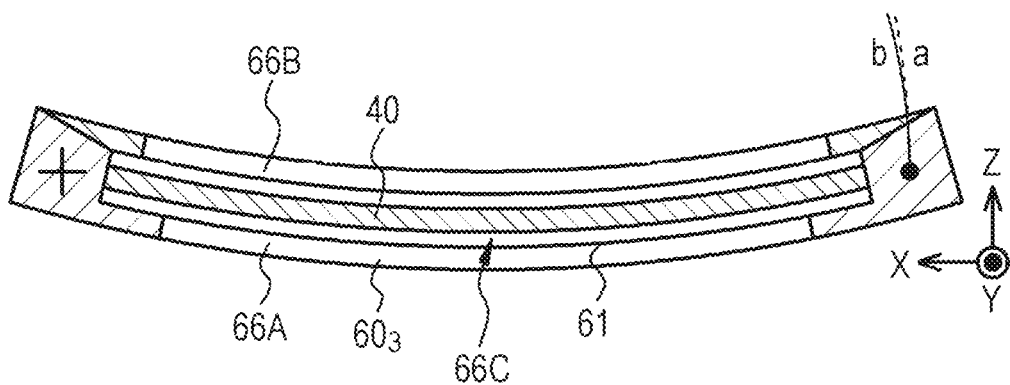
FIG. 8A is a schematic cross-sectional view of a supporting member and an image forming device constituting a display apparatus of Example 3.
Figure 8B:
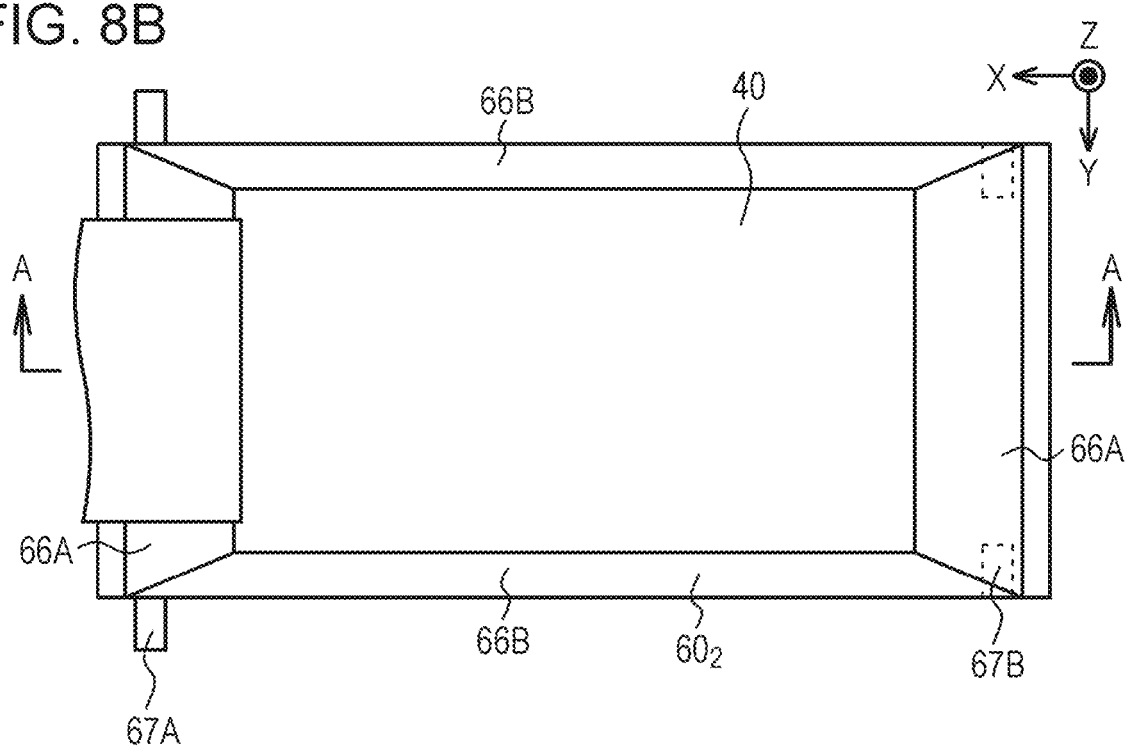
FIG. 8B is a schematic plan view of the supporting member and the image forming device.

Example 3 is modification of Example 2. Also in Example 3, the image forming device 40 is curved. However, in contrast to Example 2, the degree of the curvature is set to be variable. FIG. 8A shows a schematic cross-sectional view of a supporting member and an image forming device constituting the display apparatus or the image display device of Example 3. FIG. 8B shows a schematic plan view of the supporting member and the image forming device.

In Example 3, there is a gap between the groove portion 66C and the outer peripheral portion of the image forming device 40 extending along the X direction. In addition, protrusion portions 67A and threaded portions 67B are provided on the side surfaces extending along the X direction of a supporting member $60_3$. The supporting member 60₃ is housed in a housing (not shown in the drawing) of which the upper side is open. The housing is mounted on a part of the upper side of the casing 53R or 53L. Holes, into which the protrusion portions 67A are fitted, are formed on side surfaces of the housing. Further, guide grooves, which extend in the substantially up-down direction, are formed on parts of the side surfaces of the housing facing the threaded portions 67B. Thus, by inserting screws into the guide grooves and threadedly engaging the screws with the threaded portions 67B, the supporting member 60₃ can be fixed onto the side surfaces of the housing. Here, depending on which positions in the guide grooves the screws are fixed into, force applied to the supporting member 60₃ and the image forming device 40 in the X direction changes. In FIG. 8A, the center of the protrusion portion 67A is indicated by a cross. Further, a locus of a circle of the threaded portion 67B centered on the center of the protrusion portion 67A is indicated by the dotted line "a", and a locus of the center of the through hole is indicated by the solid line "b". When the threaded portion 67B is rotated about the center of the protrusion portion 67A so as to be moved upward in FIG. 8A, a distance from the center of the protrusion portion 67A to the center of the threaded portion 67B decreases. Therefore, compressive force is applied to the supporting member 60₃ and the image forming device 40 in the X direction. As a result, the degree of the curvature of the image forming device 40 changes. Since there is a gap between the groove portion 66C and the outer peripheral portion of the image forming device 40 extending along the X direction, the change in the degree of the curvature of the image forming device 40 is allowable. After the degree of the curvature of the image forming device 40 is determined, it is preferable that the gap be filled with an appropriate material (for example, shim). Alternatively, it is preferable that an elastic material be inserted into the gap in advance.

Figure 8C:
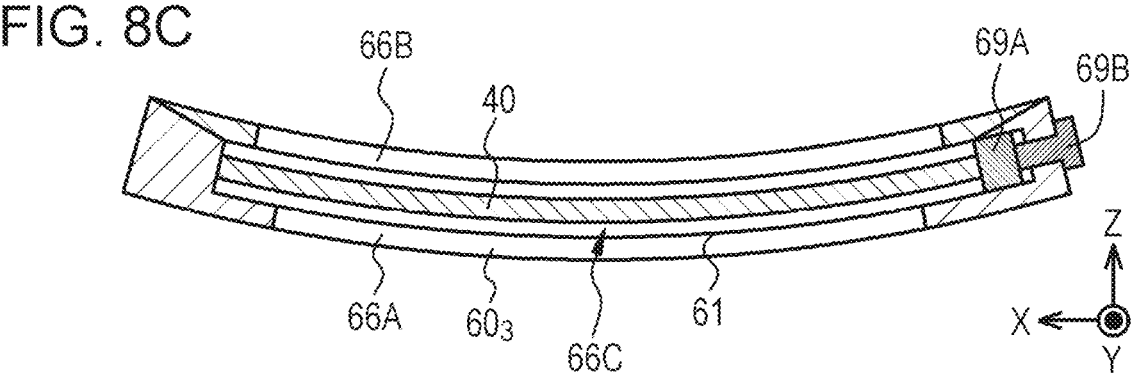
FIG. 8C is a schematic cross-sectional view of a supporting member and an image forming device constituting a display apparatus of a modification example of Example 3.

In addition, as shown in FIG. 8C which is a schematic cross-sectional view of the supporting member and the image forming device constituting the display apparatus or the image display device of the modification example of Example 3, a pushing member 68A and a pushing screw 68B for moving the pushing member 68A in the X direction may change the force applied to the supporting member 60₃ and the image forming device 40 in the X direction.

Figure 13:
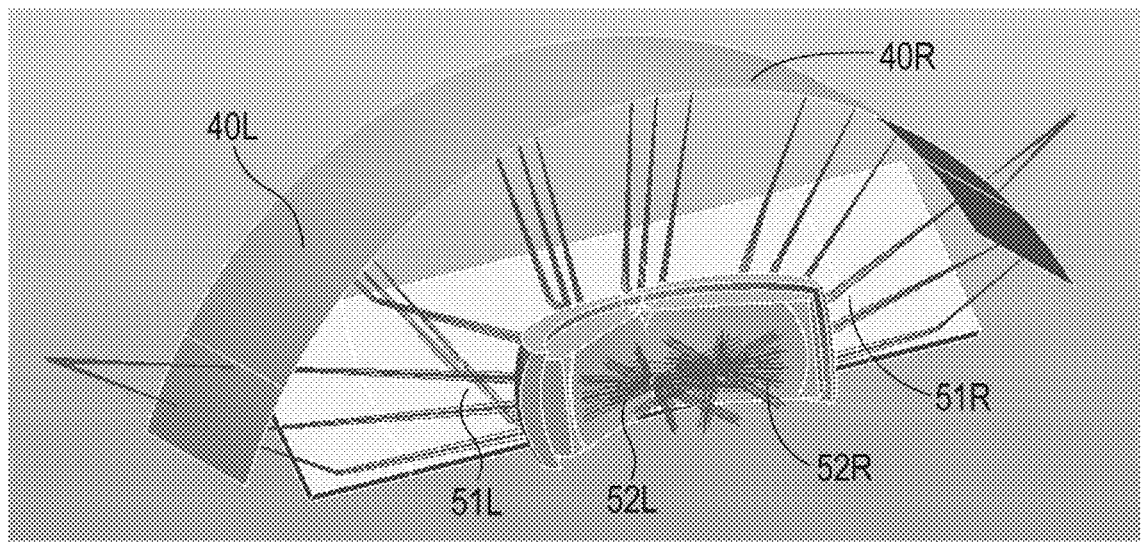
FIG. 13 is a conceptual diagram of a display apparatus of a modification example of Example 1.

The present disclosure has hitherto been described on the basis of preferred examples, but the present disclosure is not limited to such examples. The configurations or structures of the image display device and the image forming device described in the examples are examples, and may be appropriately modified. A combination of the image forming device and the supporting member, which supports the image forming device, described in the examples may constitute a projector. In some cases, as shown in FIG. 13 which is a conceptual diagram, the image display device may include: the single image forming device (indicated by 40R and 40L); the optical system that guides an image, which originates from the single image forming device, into each of the right pupil and the left pupil of the viewer; and the supporting member (not shown in the drawing) that supports the image forming device. In this case, the optical system may include, for example, at least the reflector 51L and the lens group 52L for the left eye, and the reflector 51R and the lens group 52R for the right eye.

It should be noted that the present disclosure may adopt the following configurations.

[1] <<Display Apparatus: First Embodiment>>
A display apparatus including:
(a) a frame; and
(b) an image display device that is mounted on the frame, in which the image display device includes
(A) an image forming device, and
(B) an optical system that guides an image, which originates from the image forming device, into a pupil of a viewer,
in which, assuming that a direction of the image forming device corresponding to a first direction of the image is an X direction and a direction of the image forming device corresponding to a second direction of the image different from the first direction is a Y direction, the image forming device is curved along the X direction, the Y direction, or the X and Y directions, and in which the image display device further includes an image-forming-device-to-optical-system distance adjustment unit that adjusts a distance between the image forming device and the optical system.

[2] The display apparatus according to [1], further including a display control device that controls a size of the entire image obtained from the image forming device in accordance with the distance between the image forming device and the optical system.

[3] The display apparatus according to [1] or [2], in which the optical system is formed of a reflector, which reflects the image obtained from the image forming device, and a lens group into which the image reflected by the reflector is incident, and
in which the image display device further includes a pupil-to-optical-system distance adjustment unit that adjusts a distance between the optical system and the pupil of the viewer.

[4] The display apparatus according to [3], in which the lens group is disposed between the pupil of the viewer and the reflector, and
in which the image forming device is disposed above the reflector.

[5] <<Display Apparatus: Second Embodiment>>
A display apparatus including:
(a) a frame; and
(b) an image display device that is mounted on the frame, in which the image display device includes
(A) an image forming device, and
(B) an optical system that guides an image, which originates from the image forming device, into a pupil of a viewer,
in which, assuming that a direction of the image forming device corresponding to a first direction of the image is an X direction and a direction of the image forming device corresponding to a second direction of the image different from the first direction is a Y direction, the image forming device is curved along the X direction, the Y direction, or the X and Y directions, and
in which the image display device further includes a pupil-to-optical-system distance adjustment unit that adjusts a distance between the optical system and the pupil of the viewer.

[6] The display apparatus according to [5], in which the optical system is formed of a reflector, which reflects the image obtained from the image forming device, and a lens group into which the image reflected by the reflector is incident, and
in which the pupil-to-optical-system distance adjustment unit adjusts a distance between the lens group and the pupil of the viewer.

[7] The display apparatus according to [5] or [6], in which the lens group is disposed between the pupil of the viewer and the reflector, and in which the image forming device is disposed above the reflector.

[8] The display apparatus according to any one of [1] to [7], in which assuming that an axis passing through a predetermined point of the image forming device in parallel with the X direction is an X axis and an axis passing through a predetermined point of the image forming device in parallel with the Y direction is a Y axis, the image display device further includes a rotation device that rotates the image forming device about at least one axis of the X axis, the Y axis, and a Z axis.

[9] The display apparatus according to any one of [1] to [8], further including a movement device that moves the image forming device relative to the reflector along the X direction.

[10] The display apparatus according to any one of [1] to [9], in which the image display device further includes a supporting member which supports the image forming device, and in which a supporting surface of the supporting member, which supports the image forming device, is curved.

[11] The display apparatus according to [10], in which a degree of a curvature of the supporting surface of the supporting member along the X direction is greater than a degree of a curvature thereof along the Y direction.

[12] The display apparatus according to [10] or [11], in which the supporting member includes a pressing member, in which an outer shape of the image forming device is a rectangular shape, and in which an outer peripheral portion of the image forming device, which extends along the X direction, is fixed onto the supporting member by the pressing member.

[13] The display apparatus according to [10] or [11], in which an outer shape of the image forming device is a rectangular shape, and in which an outer peripheral portion of the image forming device, which extends along the X direction, is pinched by the supporting member.

[14] The display apparatus according to any one of [1] to [13], in which an outer shape of the image forming device is a rectangular shape, and in which wiring extends outward from an outer peripheral portion of the image forming device extending along the Y direction.

[15] The display apparatus according to any one of [1] to [14], in which a lens group is formed of a group of three lenses,
in which a second lens thereof has a negative power, and
in which a refractive index of a material of the second lens is greater than refractive indexes of materials of first and third lenses.

[16] The display apparatus according to [15], in which the first and third lenses have positive powers.

[17] The display apparatus according to [15] or [16], in which the lens group is an optical system which is telecentric on a reflector side.

[18] The display apparatus according to any one of [1] to [17], further including a left-eye image display device and a right-eye image display device.

[19] The display apparatus according to [18], further including an image display device distance adjustment unit that adjusts a distance between the left-eye image display device and the right-eye image display device.

[20] The display apparatus according to any one of [1] to [19], in which the image forming device is formed of an organic electroluminescent display device.

[21] The display apparatus according to any one of [1] to [20], in which the frame is mounted on a head part of the viewer.

[22] <<Image Display Device: First Embodiment>>
An image display device including:
(A) an image forming device; and
(B) an optical system that guides an image, which originates from the image forming device, into a pupil of a viewer, in which, assuming that a direction of the image forming device corresponding to a first direction of the image is an X direction and a direction of the image forming device corresponding to a second direction of the image different from the first direction is a Y direction, the image forming device is curved along the X direction, the Y direction, or the X and Y directions, and in which the image display device further includes an image-forming-device-to-optical-system distance adjustment unit that adjusts a distance between the image forming device and the optical system.

[23] <<Image Display Device: Second Embodiment>>
A display apparatus including:
(A) an image forming device; and
(B) an optical system that guides an image, which originates from the image forming device, into a pupil of a viewer, in which, assuming that a direction of the image forming device corresponding to a first direction of the image is an X direction and a direction of the image forming device corresponding to a second direction of the image different from the first direction is a Y direction, the image forming device is curved along the X direction, the Y direction, or the X and Y directions, and in which the image display device further includes a pupil-to-optical-system distance adjustment unit that adjusts a distance between the optical system and the pupil of the viewer.

REFERENCE SIGNS LIST

10 VIEWER
20 FRAME
21 FRONT PART
22 SIDE PART
22A HOLE
23A ARM PORTION
23B FOREHEAD CONTACT PART
24 NOSE PADDING PORTION
25 HOLDING MEMBER
26 BASE
27A BUTTON
27B GUIDE GROOVE
27C FASTENING PORTION
30, 30R, 30L IMAGE DISPLAY DEVICE
40 IMAGE FORMING DEVICE
41 WIRING
50 OPTICAL SYSTEM
51, 51R, 51L REFLECTOR
52, 52R, 52L LENS GROUP
53R, 53L CASING
$60_1$, $60_2$, $60_3$ SUPPORTING MEMBER
61 SUPPORTING SURFACE
62A, 62B OUTER PERIPHERAL PORTION OF SUPPORTING MEMBER

62C CONTACT SURFACE OF OUTER PERIPHERAL PORTION
62D THREADED PORTION
63 FIXING MEMBER
64 SCREW
65 PRESSING MEMBER
65A ONE END PORTION OF PRESSING MEMBER
65B OTHER END PORTION OF PRESSING MEMBER
66A LOWER SIDE MEMBER
66B UPPER SIDE MEMBER
66C GROOVE PORTION
67A PROTRUSION PORTION
67B THREADED PORTION
68A PUSHING MEMBER
68B PUSHING SCREW
70 IMAGE DISPLAY DEVICE DISTANCE ADJUSTMENT UNIT
71 PEDESTAL
72 SIDE SURFACE POSITIONED OUTSIDE PEDESTAL
73 LEAD SCREW MECHANISM
74A, 76A PIN
75A TAP HOLE
74B, 75B, 76B GUIDE GROOVE
80 PUPIL-TO-OPTICAL-SYSTEM DISTANCE ADJUSTMENT UNIT
82 SIDE WALL
83 LEAD SCREW MECHANISM
90 IMAGE-FORMING-DEVICE-TO-OPTICAL-SYSTEM DISTANCE ADJUSTMENT UNIT
91 ADJUSTMENT UNIT BASE MEMBER
92, 94 SHAFT
93 BUSH
95 LEAD SCREW MECHANISM
96 LATCH MECHANISM
97 PIN FITTED ONTO LATCH MECHANISM

The invention claimed is:

1. A display apparatus comprising:
a frame; and
an image display device that is mounted on the frame,
wherein the image display device includes
an image forming device configured to generate an image and mounted to the frame out of a line of sight of a viewer, and
an optical system including a lens group, wherein the lens group is formed of two or more lenses,
wherein, assuming that a direction of the image forming device corresponding to a first direction of the image is an X direction and a direction of the image forming device corresponding to a second direction of the image different from the first direction is a Y direction, the image forming device is curved along the X direction, the Y direction, or the X and Y directions,
wherein the image display device further includes a pupil-to-optical-system distance adjustment section that adjusts a distance between the lens group and the pupil of the viewer based on controlling the two or more lenses, and
wherein the pupil-to-optical-system distance adjustment section includes:
a side wall mounted on the leading end portion of a holding member,
a lead screw mechanism mounted on the side wall,
a plurality of buttons provided on pedestals and extending downward from the pedestals,
a plurality of guide grooves engaging with the buttons, and
a plurality of fastening portions holding the pedestals.

2. The display apparatus according to claim 1, further comprising:
a reflector which reflects the image, wherein the lens group on which the image reflected by the reflector is incident.

3. The display apparatus according to claim 2,
wherein the lens group is disposed between the pupil of the viewer and the reflector, and
wherein the image forming device is disposed above the reflector.

4. The display apparatus according to claim 1,
wherein assuming that an axis passing through a predetermined point of the image forming device in parallel with the X direction is an X axis and an axis passing through a predetermined point of the image forming device in parallel with the Y direction is a Y axis, the image display device further includes a rotation device that rotates the image forming device about at least one axis of the X axis, the Y axis, and a Z axis.

5. The display apparatus according to claim 1, further comprising a movement device that moves the image forming device relative to the reflector along the X direction.

6. The display apparatus according to claim 1,
wherein the image display device further includes a supporting member which supports the image forming device, and wherein a supporting surface of the supporting member, which supports the image forming device, is curved.

7. The display apparatus according to claim 6, wherein a degree of a curvature of the supporting surface of the supporting member along the X direction is greater than a degree of a curvature thereof along the Y direction.

8. The display apparatus according to claim 6,
wherein the supporting member includes a pressing member,
wherein an outer shape of the image forming device is a rectangular shape, and
wherein an outer peripheral portion of the image forming device, which extends along the X direction, is fixed onto the supporting member by the pressing member.

9. The display apparatus according to claim 6,
wherein an outer shape of the image forming device is a rectangular shape, and
wherein an outer peripheral portion of the image forming device, which extends along the X direction, is pinched by the supporting member.

10. The display apparatus according to claim 1,
wherein an outer shape of the image forming device is a rectangular shape, and
wherein wiring extends outward from an outer peripheral portion of the image forming device extending along the Y direction.

11. The display apparatus according to claim 1,
wherein the lens group is formed of a group of three lenses,
wherein a second lens thereof has a negative power, and
wherein a refractive index of a material of the second lens is greater than refractive indexes of materials of first and third lenses.

12. The display apparatus according to claim 11, wherein the first and third lenses have positive powers.

13. The display apparatus according to claim 2, wherein the lens group is an optical system which is telecentric on a reflector side.

14. The display apparatus according to claim 1, further comprising a left-eye image display device and a right-eye image display device.

15. The display apparatus according to claim 1, wherein the image forming device comprises a curved organic electroluminescent display device.

16. The display apparatus according to claim 2, wherein the reflector comprises a planar mirror.

17. The display apparatus according to claim 2,
wherein the pupil-to-optical-system distance adjustment section adjusts a distance between the reflector and the pupil of the viewer.

18. The display apparatus according to claim 2, wherein the reflector reflects the image from the image forming device through the lens group to the pupil of the viewer.

* * * * *